(12) United States Patent
Ozturk et al.

(10) Patent No.: US 9,854,478 B2
(45) Date of Patent: Dec. 26, 2017

(54) TECHNIQUES FOR SWITCHING BEARERS BETWEEN RADIO ACCESS TECHNOLOGIES (RATS)

(71) Applicant: QUALCOMM Incorporated, San Diego, CA (US)

(72) Inventors: Ozcan Ozturk, San Diego, CA (US); Vikas Jain, San Diego, CA (US); Ajay Gupta, San Diego, CA (US); Abhijit Khobare, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/598,170

(22) Filed: Jan. 15, 2015

(65) Prior Publication Data

US 2015/0208286 A1    Jul. 23, 2015

Related U.S. Application Data

(60) Provisional application No. 61/928,947, filed on Jan. 17, 2014.

(51) Int. Cl.
| | |
|---|---|
| H04W 36/00 | (2009.01) |
| H04W 36/14 | (2009.01) |
| H04W 84/12 | (2009.01) |
| H04W 88/06 | (2009.01) |

(52) U.S. Cl.
CPC ....... H04W 36/0022 (2013.01); H04W 36/14 (2013.01); H04W 84/12 (2013.01); H04W 88/06 (2013.01)

(58) Field of Classification Search
CPC . H04W 36/0022; H04W 36/14; H04W 88/06; H04W 84/12; H04W 36/0027
See application file for complete search history.

(56) References Cited

U.S. PATENT DOCUMENTS

| | | | |
|---|---|---|---|
| 2006/0126565 | A1 | 6/2006 | Shaheen |
| 2009/0028091 | A1* | 1/2009 | Dimou .................. H04W 48/20 370/328 |
| 2010/0029280 | A1 | 2/2010 | Tenny et al. |
| 2013/0242783 | A1 | 9/2013 | Horn et al. |
| 2013/0329694 | A1 | 12/2013 | Vrzic et al. |

OTHER PUBLICATIONS

Second Written Opinion from International Application No. PCT/US2015/011785, dated Dec. 22, 2015, 10 pages.

(Continued)

*Primary Examiner* — Gbemileke J Onamuti
(74) *Attorney, Agent, or Firm* — Arent Fox, LLP

(57) ABSTRACT

A method, an apparatus, and a computer program product for wireless communication are provided. The apparatus serves data to a UE or receives data from the UE via a first communication link that uses a first RAT, transmits a configuration message to the UE indicating that data will be served or received via a second communication link that uses a second RAT, and initiates a configuration procedure to switch service or reception of data from the first communication link that uses the first RAT to the second communication link that uses the second RAT.

25 Claims, 21 Drawing Sheets

(56) References Cited

OTHER PUBLICATIONS

HTC: "Clarification on mobility to E-UTRA", 3GPP Draft; R2-103929 Clarification on Mobility to E-UTRA (CR. REL-09), 3rd Generation Partnership Project (3GPP), Mobile Competence Centre ; 650, Route Des Lucioles ; F-06921 Sophia-Antipolis Cedex; France, vol. RAN WG2, no. Stockholm, Sweden; Jun. 28, 2010. Jun. 21, 2010 (Jun. 21, 2010), XP050451067, pp. 1-8, [retrieved on Jun. 21, 2010].
International Search Report and Written Opinion—PCT/US2015/011785—ISA/EPO—dated Apr. 30, 2015.

* cited by examiner

TECHNIQUES FOR SWITCHING BEARERS BETWEEN RADIO ACCESS TECHNOLOGIES (RATS)

CROSS-REFERENCE TO RELATED APPLICATION(S)

This application claims the benefit of U.S. Provisional Application Ser. No. 61/928,947, entitled "TECHNIQUES FOR SWITCHING BEARERS BETWEEN RADIO ACCESS TECHNOLOGIES (RATS)" and filed on Jan. 17, 2014, which is expressly incorporated by reference herein in its entirety.

BACKGROUND

Field

The present disclosure relates generally to communication systems, and more particularly, to techniques switching bearers between radio access technologies (RATs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, techniques for switching bearers between radio access technologies (RATs) are provided. In an aspect of the disclosure, a method, a computer program product, and an apparatus are provided. In an aspect, a method performed by an apparatus includes serving data to a user equipment (UE) or receiving data from the UE via a first communication link that uses a first RAT, transmitting a configuration message to the UE indicating that data will be served or received via a second communication link that uses a second RAT, and initiating a configuration procedure to switch service or reception of data from the first communication link that uses the first RAT to the second communication link that uses the second RAT.

The method further includes determining unacknowledged data of the data served using the first RAT.

In an aspect, the method further includes forwarding the unacknowledged data to be served using the second RAT.

In an aspect, the configuration message may comprise a data status report and a request for a data status report from the UE.

In an aspect, the method further includes determining to serve the data using the second RAT based on at least one condition.

In an aspect, the at least one condition comprises reception of a physical layer acknowledgment for the configuration message from the UE, reception of a radio resource control (RRC) message in response to the configuration message.

In an aspect, the method further includes resetting a radio link control (RLC) layer upon determining to serve the data using the second RAT.

In an aspect, the method further includes receiving at least one protocol layer status report from the UE, the at least one protocol layer status report identifying data received by the UE via the first RAT, wherein the unacknowledged data is determined based on the at least one protocol layer status report.

In an aspect, the at least one protocol layer status report is received via the first RAT.

In an aspect, the at least one protocol layer status report comprises at least one of a packet data convergence protocol (PDCP) layer status report or a radio link control (RLC) layer status report.

In an aspect, the method further includes receiving an acknowledgment message from the UE for the configuration message via the first communication link that uses the first RAT, wherein at least one protocol layer status report is received from the UE concurrently with the acknowledgment message or within the acknowledgment message.

In an aspect, the method further includes receiving an acknowledgment from the UE for the configuration message, wherein the unacknowledged data is forwarded to the second RAT in response to the received acknowledgment.

In an aspect, the method further includes detecting a physical layer acknowledgment for the configuration message, wherein the unacknowledged data is forwarded in response to the detected physical layer acknowledgment.

In an aspect, the method further includes sending at least one protocol layer status report to the UE.

In an aspect, the at least one protocol layer status report is sent to the UE concurrently with the configuration message or within the configuration message or another signaling message.

In an aspect, the method further includes sending the at least one protocol layer status report on a data bearer that is being switched.

In an aspect, the method further includes sending the at least one protocol layer status report on another data bearer that is not being switched and that is served by either the first communication link that uses the first RAT or the second communication link that uses the second RAT.

In an aspect, the at least one protocol layer status report is sent via the first RAT or the second RAT.

In an aspect, the at least one protocol layer status report is sent to the UE via the first RAT either concurrently with the configuration message, after reception of a physical layer acknowledgment from the UE for the configuration message, or after receiving an acknowledgment message from the UE for the configuration message.

In an aspect, the at least one protocol layer status report comprises at least one of a packet data convergence protocol (PDCP) layer status report or a radio link control (RLC) layer status report.

In an aspect, the method further includes receiving feedback information from an access point (AP), wherein the feedback information indicates the status for successfully transmitted and failed data packets.

In an aspect, the method further includes storing a copy of the data to be served via the second communication link that uses the second RAT in a buffer.

In an aspect, the method further includes receiving feedback information from an AP or the UE for a status of transmission success of packets, determining, based on the feedback information, whether an amount of forwarded data that is waiting in a buffer of the UE or the AP exceeds a threshold, and no longer forwarding data to the AP when the amount of the data in the AP buffer exceeds the threshold.

In an aspect, the method further includes no longer forwarding data to the AP or the UE when an amount of failed packets due to transmission errors on the second RAT exceeds a threshold.

In an aspect, the method further includes sending and receiving at least one protocol layer status report to and from the UE via the first communication link that uses the first RAT or the second communication link that uses the second RAT.

In an aspect, the at least one protocol layer status report is received through an AP or the UE when the at least one protocol layer status report is received via the second RAT.

In an aspect, the method further includes no longer forwarding data to the AP or the UE when the amount of failed packets due to transmission errors on the second communication link that uses the second RAT exceeds a threshold.

In an aspect, the method further includes receiving data served from a network or transmitting data to the network via a first communication link that uses a first RAT, receiving a configuration message from the network indicating that data will be served from the network or transmitted to the network via a second communication link that uses a second RAT, configuring at least one protocol layer based on the received configuration message to receive the data served from the network or transmit data to the network via the second communication link that uses the second RAT, receiving the data served from the network or transmitting data to the network via the second communication link that uses the second RAT.

In an aspect, the configuration message comprises at least one of a data status report or a request for a data status report.

In an aspect, the method further includes transmitting at least one of a physical layer acknowledgment for the configuration message or a radio resource control (RRC) message in response to the configuration message.

In an aspect, the method further includes starting a timer upon transmitting the physical layer acknowledgement, waiting to receive at least one protocol layer status report until expiration of the timer, and resetting one or more protocol layers upon expiration of the timer.

In an aspect, the method further includes clearing a buffer for storing the data received via the second communication link that uses the second RAT after configuring the at least one protocol layer.

In an aspect, the method further includes transmitting at least one protocol layer status report to the network, the at least one protocol layer status report identifying data received by the UE via the first RAT or second RAT.

In an aspect, the method further includes sending the at least one protocol layer status report on a configuration acknowledgment message or another signaling message.

In an aspect, the method further includes sending the at least one protocol layer status report on a data bearer that is being switched.

In an aspect, the method further includes sending the at least one protocol layer status report on another data bearer that is not being switched and that is served by either the first communication link that uses the first RAT or the second communication link that uses the second RAT.

In an aspect, the at least one protocol layer status report is transmitted via the first communication link that uses the first RAT.

In an aspect, the at least one protocol layer status report comprises at least one of a packet data convergence protocol (PDCP) layer status report or a radio link control (RLC) layer status report.

In an aspect, the method further includes transmitting an acknowledgment message to the network for the received configuration message concurrently with at least one protocol layer status report via the first communication link that uses the first RAT, or transmitting an acknowledgment message that includes the at least one protocol layer status report to the network for the received configuration message via the first communication link that uses the first RAT.

In an aspect, the method further includes receiving at least one protocol layer status report.

In an aspect, the at least one protocol layer status report is received concurrently with the configuration message or within the configuration message.

In an aspect, the at least one protocol layer status report is received via the first RAT or the second RAT.

In an aspect, the at least one protocol layer status report is received via the first RAT either concurrently with the configuration message, after transmission of a physical layer acknowledgment to the network for the configuration message, or after transmission of an acknowledgment message to the network for the configuration message.

In an aspect, the at least one protocol layer status report comprises at least one of a packet data convergence protocol (PDCP) layer status report or a radio link control (RLC) layer status report.

In an aspect, the method further includes transmitting feedback information to the network through an AP using the second communication link, wherein the feedback information indicates the status for successfully transmitted and failed data packets.

In an aspect, the method further includes transmitting feedback information to the network for a status of transmission success of packets.

In an aspect, the method further includes sending and receiving at least one protocol layer status report to and from the network via the first communication link that uses the first RAT or the second communication link that uses the second RAT.

In an aspect, the at least one protocol layer status report is sent to the network through an AP when the at least one protocol layer status report is sent via the second communication link that uses the second RAT.

In an aspect, a method performed by an apparatus includes serving data forwarded by a network to a UE via a first communication link that uses a first RAT, receiving a message from the network indicating that the data will be served to the UE via a second communication link that uses a second RAT, no longer serving the data to the UE via the first communication link that uses the first RAT upon receiving the message.

In an aspect, the method further includes dropping unacknowledged data stored in a buffer upon receiving the message.

In an aspect, the method further includes no longer serving the data forwarded by the network to the UE when an amount of failed data due to transmission errors on the first RAT exceeds a threshold.

In an aspect, the method further includes receiving at least one protocol layer status report from the UE via the first communication link that uses the first RAT, and sending the at least one protocol layer status report to the network.

In an aspect, an apparatus for wireless communication includes means for serving data to a UE or receiving data from the UE via a first communication link that uses a first RAT, means for transmitting a configuration message to the UE indicating that data will be served or received via a second communication link that uses a second RAT, and means for initiating a configuration procedure to switch service or reception of data from the first communication link that uses the first RAT to the second communication link that uses the second RAT.

In an aspect, the apparatus further includes means for determining unacknowledged data of the data served using the first RAT.

In an aspect, the apparatus further includes means for forwarding the unacknowledged data to be served using the second RAT.

In an aspect, the configuration message may comprise a data status report and a request for a data status report from the UE.

In an aspect, the apparatus further includes means for determining to serve the data using the second RAT based on at least one condition.

In an aspect, the at least one condition comprises reception of a physical layer acknowledgment for the configuration message from the UE, reception of a radio resource control (RRC) message in response to the configuration message.

In an aspect, the apparatus further includes means for resetting a radio link control (RLC) layer upon determining to serve the data using the second RAT.

In an aspect, the apparatus further includes means for receiving at least one protocol layer status report from the UE, the at least one protocol layer status report identifying data received by the UE via the first RAT, wherein the unacknowledged data is determined based on the at least one protocol layer status report.

In an aspect, the at least one protocol layer status report is received via the first RAT.

In an aspect, the at least one protocol layer status report comprises at least one of a packet data convergence protocol (PDCP) layer status report or a radio link control (RLC) layer status report.

In an aspect, the apparatus further includes means for receiving an acknowledgment message from the UE for the configuration message via the first communication link that uses the first RAT, wherein at least one protocol layer status report is received from the UE concurrently with the acknowledgment message or within the acknowledgment message.

In an aspect, the apparatus further includes means for receiving an acknowledgment from the UE for the configuration message, wherein the unacknowledged data is forwarded to the second RAT in response to the received acknowledgment.

In an aspect, the apparatus further includes means for detecting a physical layer acknowledgment for the configuration message, wherein the unacknowledged data is forwarded in response to the detected physical layer acknowledgment.

In an aspect, the apparatus further includes means for sending at least one protocol layer status report to the UE.

In an aspect, the at least one protocol layer status report is sent to the UE concurrently with the configuration message or within the configuration message or another signaling message.

In an aspect, the apparatus further includes means for sending the at least one protocol layer status report on a data bearer that is being switched.

In an aspect, the apparatus further includes means for sending the at least one protocol layer status report on another data bearer that is not being switched and that is served by either the first communication link that uses the first RAT or the second communication link that uses the second RAT.

In an aspect, the at least one protocol layer status report is sent via the first RAT or the second RAT.

In an aspect, the at least one protocol layer status report is sent to the UE via the first RAT either concurrently with the configuration message, after reception of a physical layer acknowledgment from the UE for the configuration message, or after receiving an acknowledgment message from the UE for the configuration message.

In an aspect, the at least one protocol layer status report comprises at least one of a packet data convergence protocol (PDCP) layer status report or a radio link control (RLC) layer status report.

In an aspect, the apparatus further includes means for receiving feedback information from the AP, wherein the feedback information indicates the status for successfully transmitted and failed data packets.

In an aspect, the apparatus further includes means for storing a copy of the data to be served via the second communication link that uses the second RAT in a buffer.

In an aspect, the apparatus further includes means for receiving feedback information from an AP or the UE for a status of transmission success of packets, means for determining, based on the feedback information, whether an amount of forwarded data that is waiting in a buffer of the UE or the AP exceeds a threshold, and means for no longer forwarding data to the AP when the amount of the data in the AP buffer exceeds the threshold.

In an aspect, the apparatus further includes means for no longer forwarding data to the AP or the UE when an amount of failed packets due to transmission errors on the second RAT exceeds a threshold.

In an aspect, the apparatus further includes means for sending and receiving at least one protocol layer status report to and from the UE via the first communication link that uses the first RAT or the second communication link that uses the second RAT.

In an aspect, the at least one protocol layer status report is received through an AP or the UE when the at least one protocol layer status report is received via the second RAT.

In an aspect, the apparatus further includes means for no longer forwarding data to the AP or the UE when the amount of failed packets due to transmission errors on the second communication link that uses the second RAT exceeds a threshold.

In an aspect, an apparatus for wireless communication includes means for receiving data served from a network or transmitting data to the network via a first communication link that uses a first RAT, means for receiving a configuration message from the network indicating that data will be served from the network or transmitted to the network via a second communication link that uses a second RAT, means for configuring at least one protocol layer based on the received configuration message to receive the data served from the network or transmit data to the network via the second communication link that uses the second RAT, means for receiving the data served from the network or transmitting data to the network via the second communication link that uses the second RAT.

In an aspect, the configuration message comprises at least one of a data status report or a request for a data status report.

In an aspect, the apparatus further includes means for transmitting at least one of a physical layer acknowledgment for the configuration message or a radio resource control (RRC) message in response to the configuration message.

In an aspect, the apparatus further includes means for starting a timer upon transmitting the physical layer acknowledgement, means for waiting to receive at least one protocol layer status report until expiration of the timer, means for resetting one or more protocol layers upon expiration of the timer.

In an aspect, the apparatus further includes means for clearing a buffer for storing the data received via the second communication link that uses the second RAT after configuring the at least one protocol layer.

In an aspect, the apparatus further includes means for transmitting at least one protocol layer status report to the network, the at least one protocol layer status report identifying data received by the UE via the first RAT or second RAT.

In an aspect, the apparatus further includes means for sending the at least one protocol layer status report on a configuration acknowledgment message or another signaling message.

In an aspect, the apparatus further includes means for sending the at least one protocol layer status report on a data bearer that is being switched.

In an aspect, the apparatus further includes means for sending the at least one protocol layer status report on another data bearer that is not being switched and that is served by either the first communication link that uses the first RAT or the second communication link that uses the second RAT.

In an aspect, the at least one protocol layer status report is transmitted via the first communication link that uses the first RAT.

In an aspect, the at least one protocol layer status report comprises at least one of a packet data convergence protocol (PDCP) layer status report or a radio link control (RLC) layer status report.

In an aspect, the apparatus further includes means for transmitting an acknowledgment message to the network for the received configuration message concurrently with at least one protocol layer status report via the first communication link that uses the first RAT, or means for transmitting an acknowledgment message that includes the at least one protocol layer status report to the network for the received configuration message via the first communication link that uses the first RAT.

In an aspect, the apparatus further includes means for receiving at least one protocol layer status report.

In an aspect, the at least one protocol layer status report is received concurrently with the configuration message or within the configuration message.

In an aspect, the at least one protocol layer status report is received via the first RAT or the second RAT.

In an aspect, the at least one protocol layer status report is received via the first RAT either concurrently with the configuration message, after transmission of a physical layer acknowledgment to the network for the configuration message, or after transmission of an acknowledgment message to the network for the configuration message.

In an aspect, the at least one protocol layer status report comprises at least one of a packet data convergence protocol (PDCP) layer status report or a radio link control (RLC) layer status report.

In an aspect, the apparatus further includes means for transmitting feedback information to the network through an AP using the second communication link, wherein the feedback information indicates the status for successfully transmitted and failed data packets.

In an aspect, the apparatus further includes means for transmitting feedback information to the network for a status of transmission success of packets.

In an aspect, the apparatus further includes means for sending and receiving at least one protocol layer status report to and from the network via the first communication link that uses the first RAT or the second communication link that uses the second RAT.

In an aspect, the at least one protocol layer status report is sent to the network through an AP when the at least one protocol layer status report is sent via the second communication link that uses the second RAT.

In an aspect, an apparatus for wireless communication includes means for serving data forwarded by a network to a UE via a first communication link that uses a first RAT, means for receiving a message from the network indicating that the data will be served to the UE via a second communication link that uses a second RAT, and means for no longer serving the data to the UE via the first communication link that uses the first RAT upon receiving the message.

In an aspect, the apparatus further includes means for dropping unacknowledged data stored in a buffer upon receiving the message.

In an aspect, the apparatus further includes means for no longer serving the data forwarded by the network to the UE when an amount of failed data due to transmission errors on the first RAT exceeds a threshold.

In an aspect, the apparatus further includes means for receiving at least one protocol layer status report from the UE via the first communication link that uses the first RAT, and means for sending the at least one protocol layer status report to the network.

In an aspect, an apparatus for wireless communication includes a memory and at least one processor coupled to the memory. The at least one processor is configured to serve data to a UE or receive data from the UE via a first communication link that uses a first RAT, transmit a configuration message to the UE indicating that data will be served or received via a second communication link that uses a second RAT, and initiate a configuration procedure to switch service or reception of data from the first communication link that uses the first RAT to the second communication link that uses the second RAT.

In an aspect, an apparatus for wireless communication includes a memory and at least one processor coupled to the memory. The at least one processor is configured to receive data served from a network or transmit data to the network via a first communication link that uses a first RAT, receive a configuration message from the network indicating that data will be served from the network or transmitted to the network via a second communication link that uses a second RAT, configure at least one protocol layer based on the received configuration message to receive the data served from the network or transmit data to the network via the second communication link that uses the second RAT, and receive the data served from the network or transmit data to the network via the second communication link that uses the second RAT.

In an aspect, an apparatus for wireless communication includes a memory and at least one processor coupled to the memory. The at least one processor is configured to serve data forwarded by a network to a UE via a first communication link that uses a first RAT, receive a message from the network indicating that the data will be served to the UE via a second communication link that uses a second RAT, and no longer serve the data to the UE via the first communication link that uses the first RAT upon receiving the message.

In an aspect, a computer program product includes a computer-readable medium that includes code for serving data to a UE or receiving data from the UE via a first communication link that uses a first RAT, transmitting a configuration message to the UE indicating that data will be served or received via a second communication link that uses a second RAT, and initiating a configuration procedure to switch service or reception of data from the first communication link that uses the first RAT to the second communication link that uses the second RAT.

In an aspect, a computer program product includes a computer-readable medium that includes code for receiving data served from a network or transmitting data to the network via a first communication link that uses a first RAT, receiving a configuration message from the network indicating that data will be served from the network or transmitted to the network via a second communication link that uses a second RAT, configuring at least one protocol layer based on the received configuration message to receive the data served from the network or transmit data to the network via the second communication link that uses the second RAT, and receiving the data served from the network or transmitting data to the network via the second communication link that uses the second RAT.

In an aspect, a computer program product includes a computer-readable medium that includes code for serving data forwarded by a network to a UE via a first communication link that uses a first RAT, receiving a message from the network indicating that the data will be served to the UE via a second communication link that uses a second RAT, and no longer serving the data to the UE via the first communication link that uses the first RAT upon receiving the message.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

Figure 1:
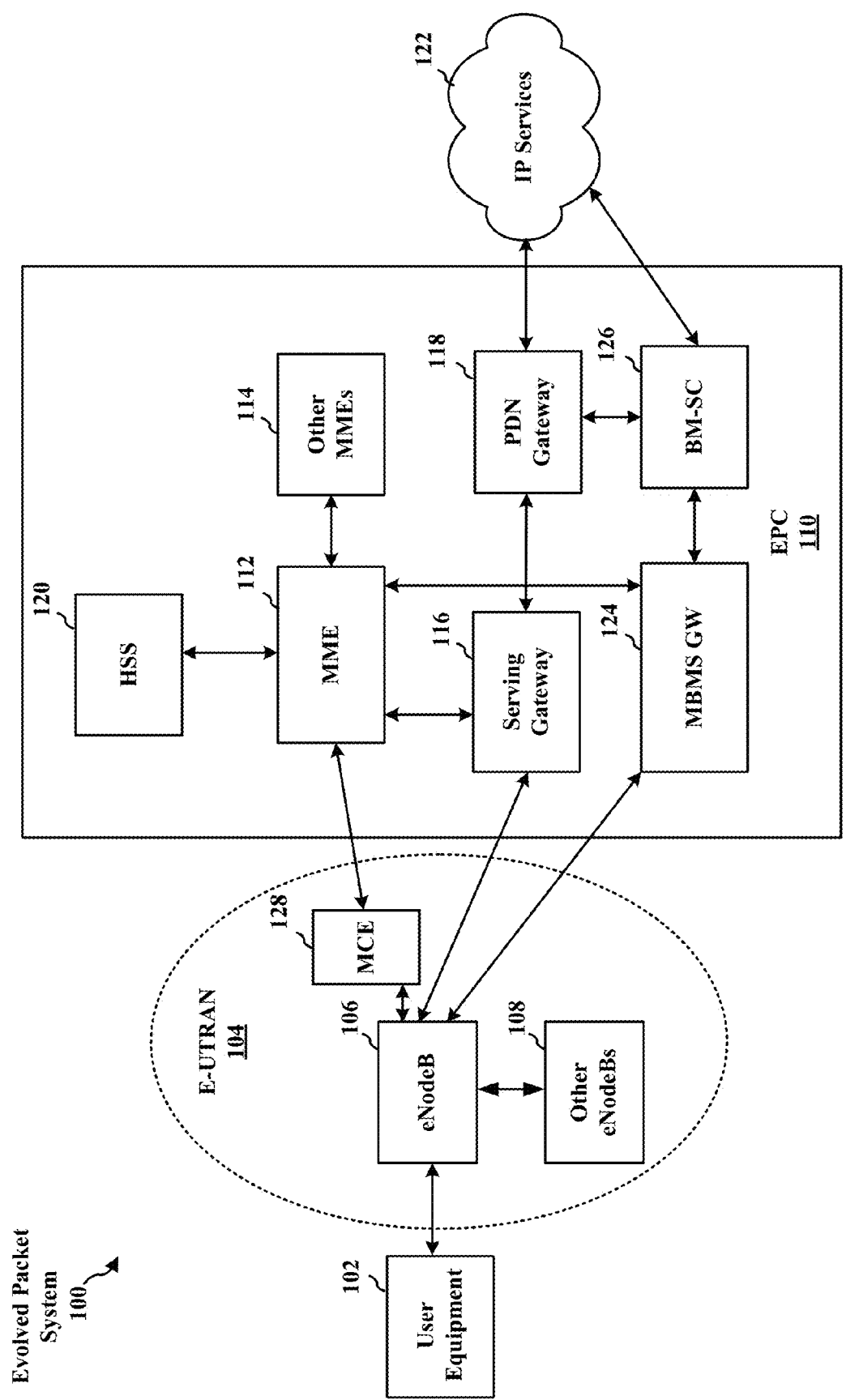
FIG. 1 is a diagram illustrating an example of a network architecture, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100, in accordance with various aspects of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS 100 can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 104 includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a station (STA), mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
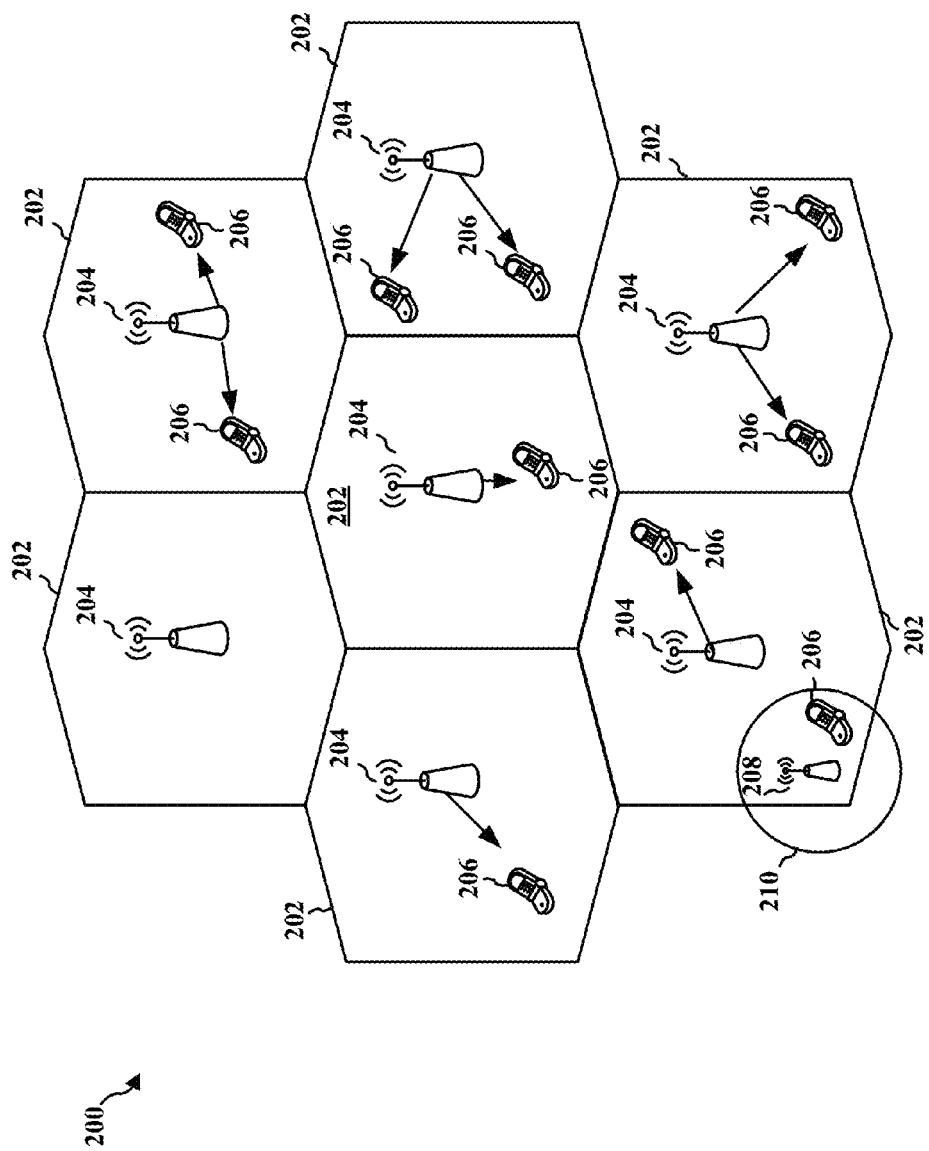
FIG. 2 is a diagram illustrating an example of an access network, in accordance with various aspects of the present disclosure.

FIG. 2 is a diagram illustrating an example of an access network 200 in an LTE network architecture, in accordance with various aspects of the present disclosure. In this example, the access network 200 is divided into a number of cellular regions (cells) 202. One or more lower power class eNBs 208 may have cellular regions 210 that overlap with one or more of the cells 202. The lower power class eNBs 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
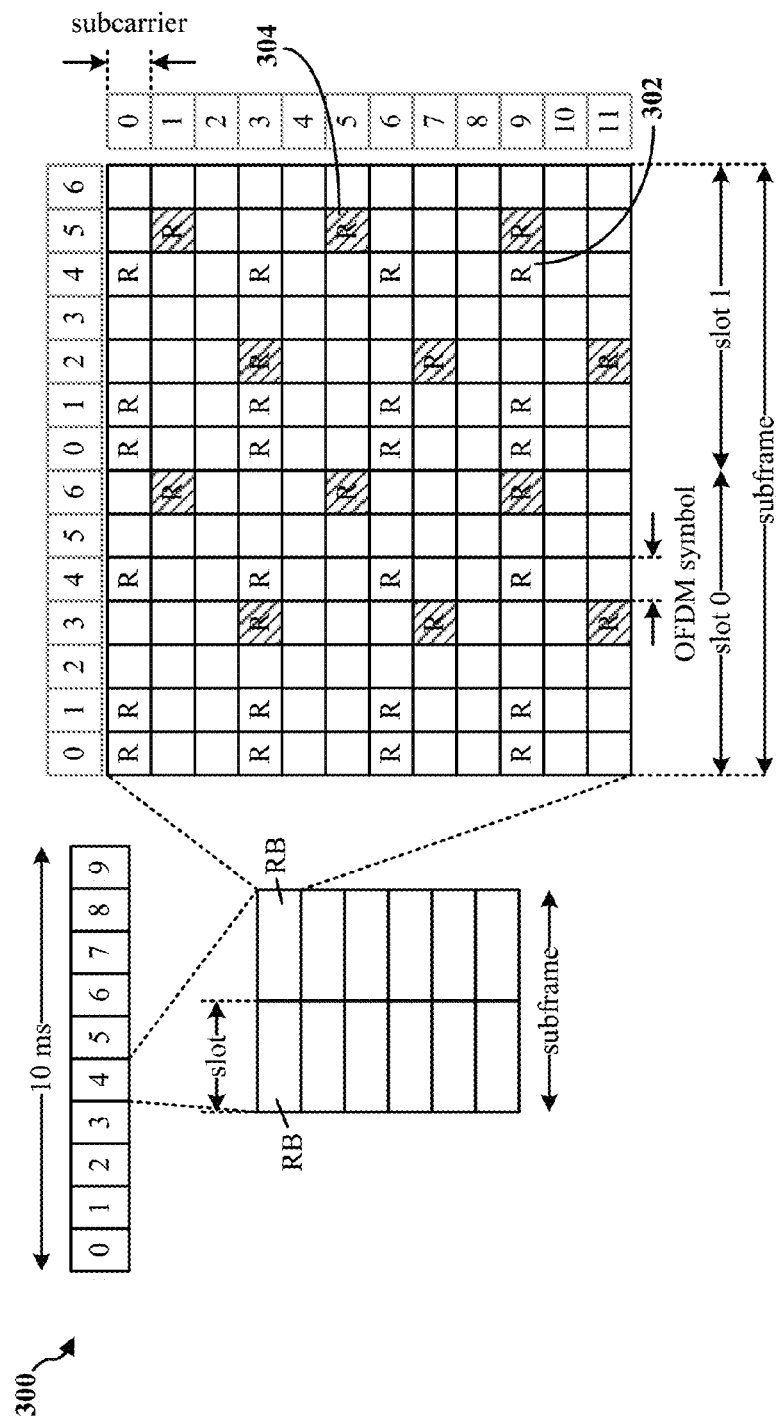
FIG. 3 is a diagram illustrating an example of a DL frame structure in LTE, in accordance with various aspects of the present disclosure.

FIG. 3 is a diagram 300 illustrating an example of a DL frame structure in LTE, in accordance with various aspects of the present disclosure. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
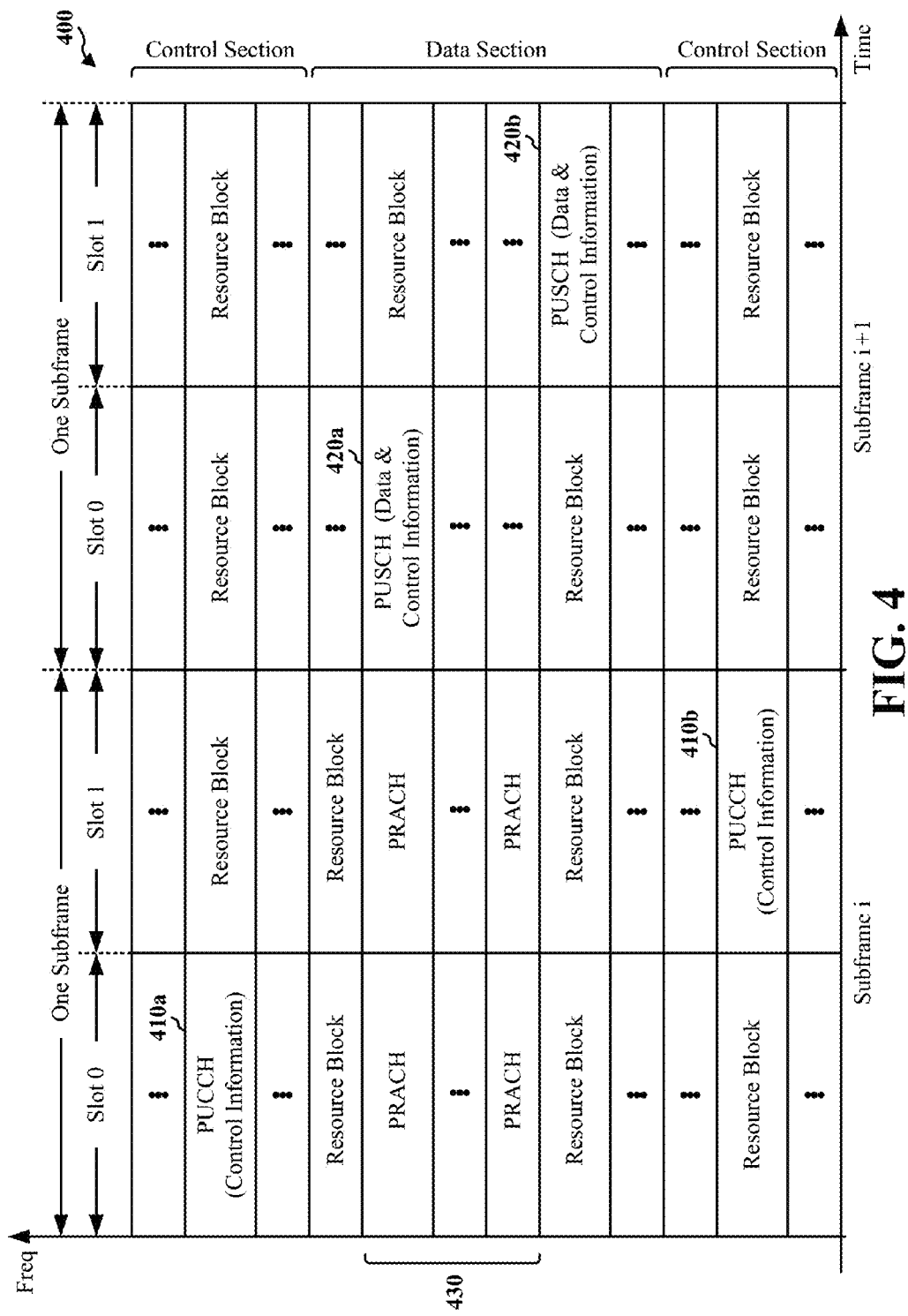
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
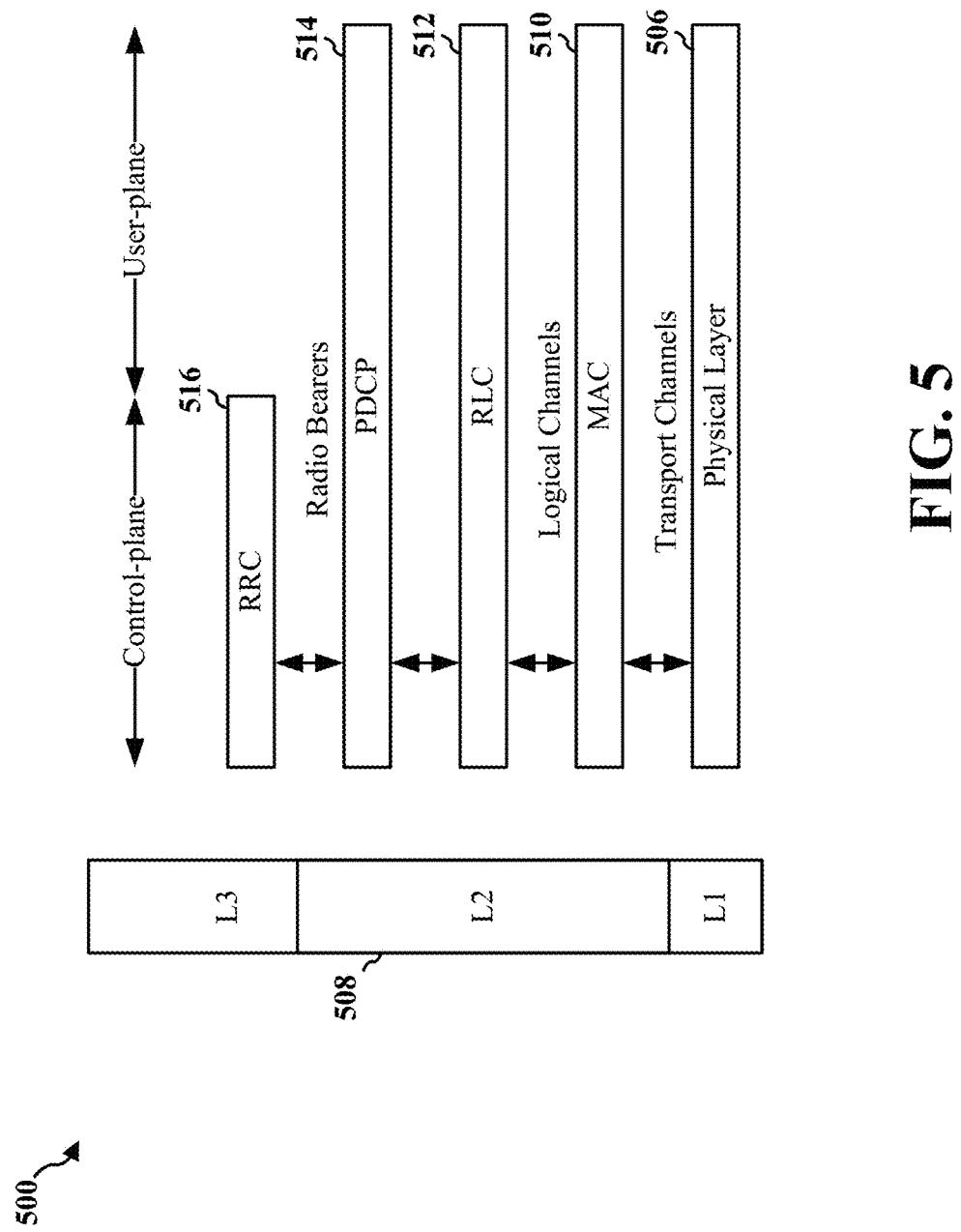
FIG. 5 is a diagram illustrating an example of a radio protocol architecture for the user and control planes, in accordance with various aspects of the present disclosure.

FIG. 5 is a diagram 500 illustrating an example of a radio protocol architecture for the user and control planes in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
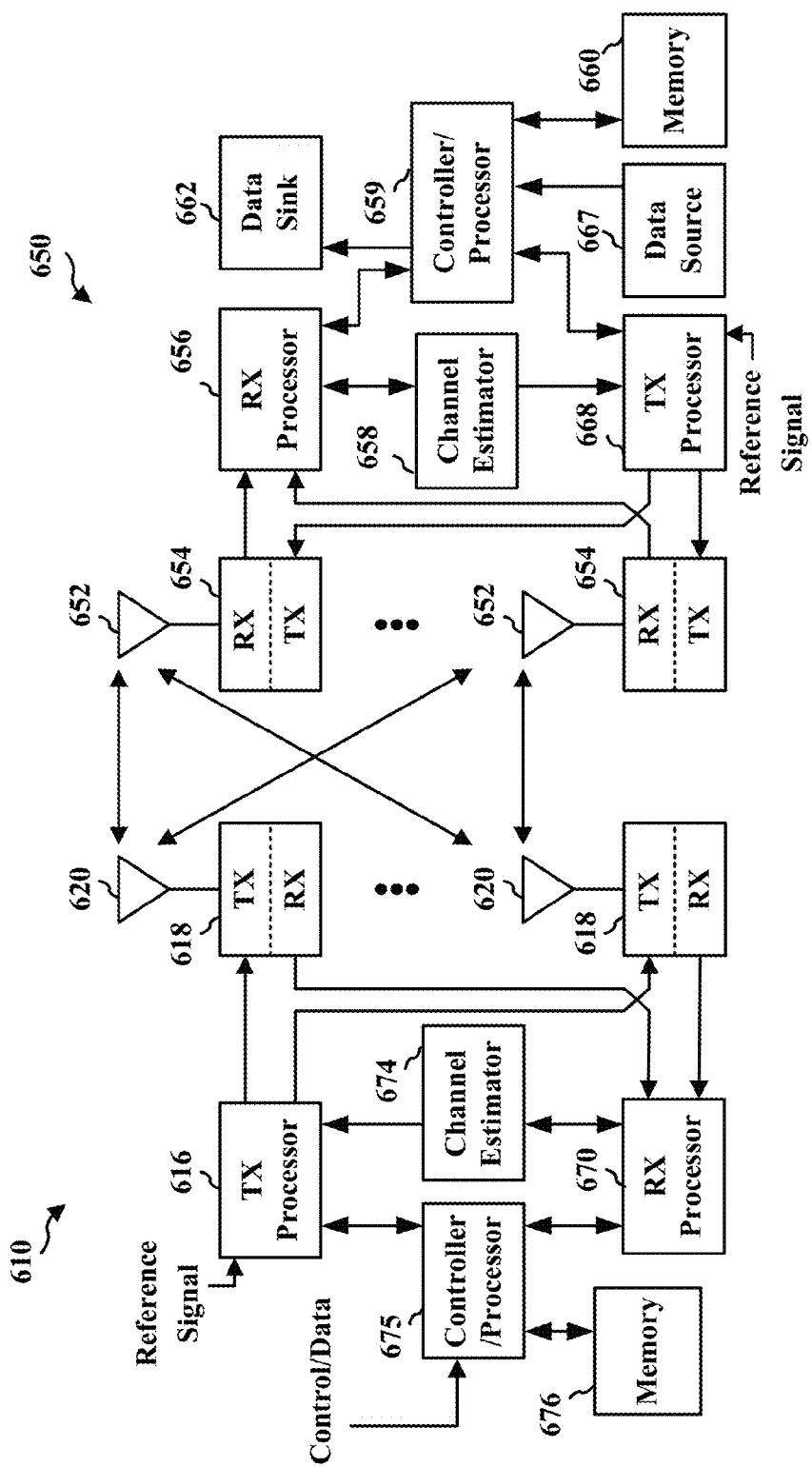
FIG. 6 is a diagram illustrating an example of an evolved Node B and user equipment in an access network, in accordance with various aspects of the present disclosure.

FIG. 6 is a block diagram of an eNB 610 in communication with a UE 650 in an access network, in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
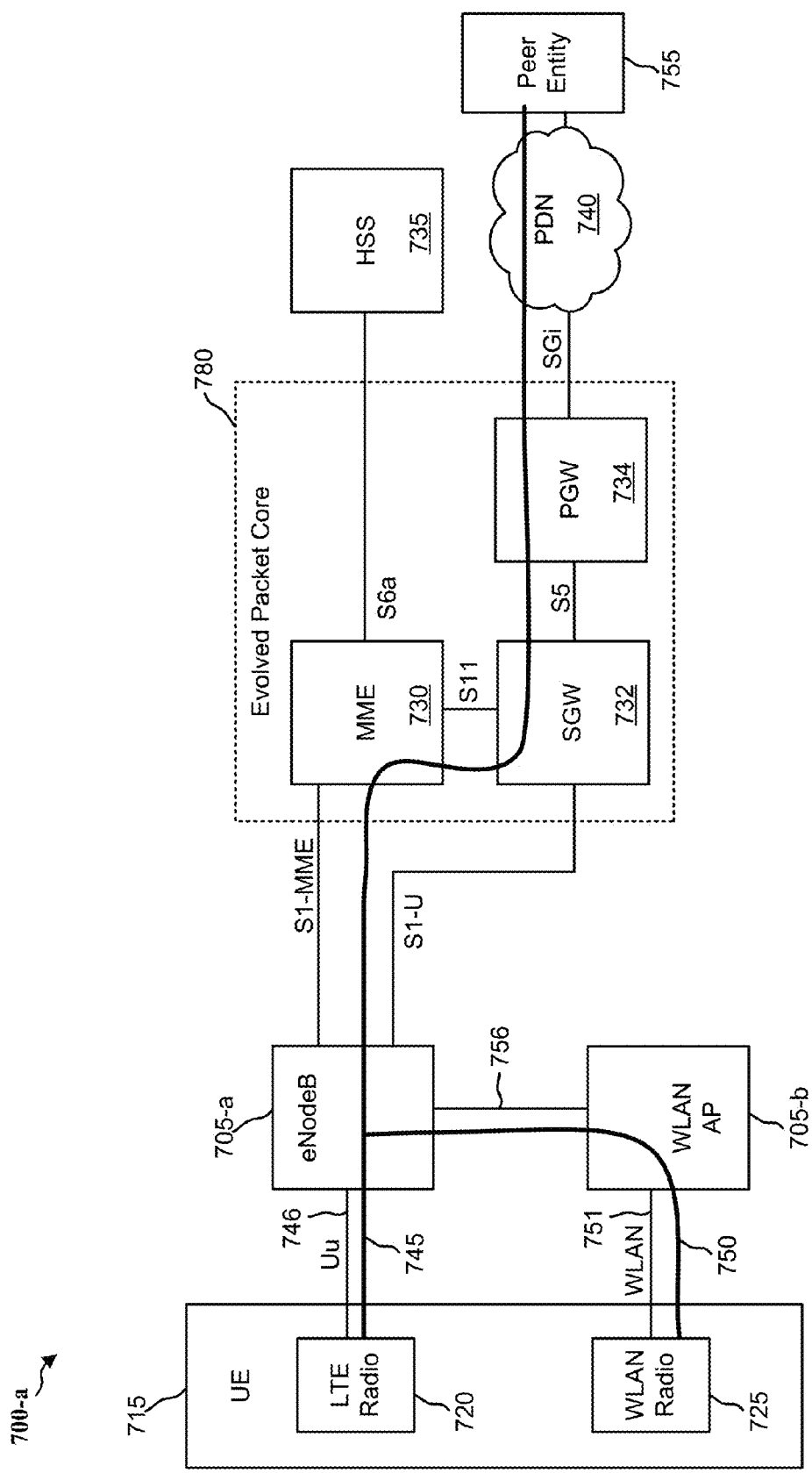
FIG. 7A is a block diagram conceptually illustrating an example of data paths between a UE and a PDN in accordance with an aspect of the present disclosure in accordance with various aspects of the present disclosure.

FIG. 7A is a diagram of a wireless communication system 700-a illustrating an example of data paths 745 and 750 between a UE 715 and a PDN 740 (e.g., Internet) in accordance with an aspect of the present disclosure. In an aspect, the data paths 745 and 750 are configured to enable aggregation of data from WWAN (e.g., LTE network) and WLAN (e.g., WiFi™ network) radio access technologies (RATs). As shown in FIG. 7A, the wireless communication system 700-a may include the UE 715 (also referred to as a multi-mode UE 715), an eNB 705-a, a WLAN AP 705-b, an evolved packet core (EPC) 780, a PDN 740, and a peer entity 755. The EPC 780 may include a mobility management entity (MME) 730, a serving gateway (SGW) 732, and a PDN gateway (PGW) 734. A home subscriber system (HSS) 735 may be communicatively coupled with the MME 730. The UE 715 may include an LTE radio 720 and a WLAN radio 725.

The eNB 705-a and WLAN AP 705-b may be collocated or otherwise in high-speed communication (e.g., via a fiber connection) with each other via connection 756. In the configuration of FIG. 7A, EPS bearer-related data between the UE 715 and the WLAN AP 705-b may be routed to the EPC 780 through the eNB 705-a. In this way, all EPS bearer-related data may be forwarded along the same path between the eNB 705-a, the EPC 780, the PDN 740, and the peer entity 755.

As shown in FIG. 7A, the eNB 705-a and the WLAN AP 705-b may be capable of providing the UE 715 with access to the PDN 740 using the aggregation of one or more LTE component carriers or one or more WLAN component carriers. Using this access to the PDN 740, the UE 715 may communicate with the peer entity 755.

The MME 730 may be the control node that processes the signaling between the UE 715 and the EPC 780. Generally, the MME 730 may provide bearer and connection management. The MME 730 may, therefore, be responsible for idle mode UE tracking and paging, bearer activation and deactivation, and SGW selection for the UE 715. The MME 730 may communicate with the eNB 705-a over an S1-MME interface. The MME 730 may additionally authenticate the UE 715 and implement Non-Access Stratum (NAS) signaling with the UE 715.

The HSS 735 may, among other functions, store subscriber data, manage roaming restrictions, manage accessible access point names (APNs) for a subscriber, and associate subscribers with MME 730. The HSS 735 may communicate with the MME 730 over an S6a interface defined by the Evolved Packet System (EPS) architecture standardized by the 3GPP organization.

As shown in FIG. 7A, the SGW 732 may be connected to the MME 730 over an S11 signaling interface and may be connected to the PDN gateway 734 over an S5 signaling interface. All user IP packets transmitted over LTE may be transferred through the eNB 705-a to the SGW 732 through the MME 730. The SGW 732 may reside in the user plane and act as a mobility anchor for inter-eNB handovers and handovers between different access technologies. The PDN gateway 734 may provide UE IP address allocation as well as other functions.

The PDN gateway 734 may provide connectivity to one or more external packet data networks, such as PDN 740, over an SGi signaling interface. The PDN 740 may include the Internet, an Intranet, an IP Multimedia Subsystem (IMS), a Packet-Switched (PS) Streaming Service (PSS), and/or other types of PDNs.

In the present example, user plane data between the UE 715 and the EPC 780 may traverse the same set of one or more EPS bearers, irrespective of whether the traffic flows over data path 745 of the LTE link or data path 750 of the WLAN link. Signaling or control plane data related to the set of one or more EPS bearers may be transmitted between the LTE radio 720 of the UE 715 and the MME 730 of the EPC 780, by way of the eNB 705-a.

As shown in FIG. 7A, the UE is simultaneously connected to the eNB 705-a and the WLAN AP 705-b, which provide radio access links to transport a user's signaling and data traffic. Therefore, in the aspect of FIG. 7A, a user's data or signaling bearer may be served by either LTE or WLAN radio links.

Figure 7B:
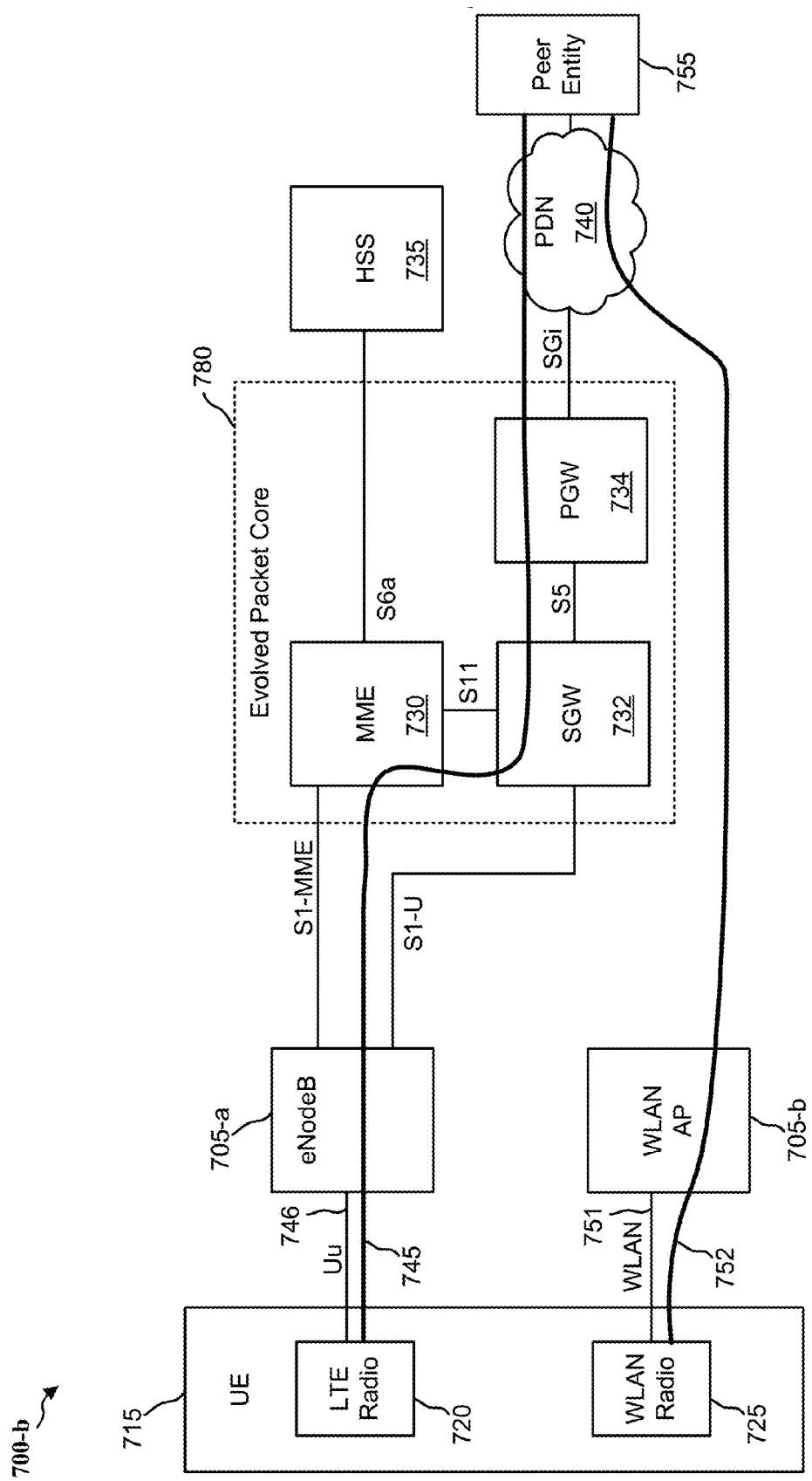
FIG. 7B is a block diagram conceptually illustrating another example of data paths between a UE and a PDN in accordance with an aspect of the present disclosure in accordance with various aspects of the present disclosure.

FIG. 7B is a diagram of a wireless communication system 700-b illustrating an example of data paths 745 and 752 between the UE 715 and the PDN 740 in accordance with an aspect of the present disclosure. The data paths 745 and 752 are shown within the context of a wireless communication system 700-b for aggregating data from WLAN and WWAN radio access technologies, which is substantially similar to the wireless communication system 700-a of FIG. 7A. As shown in the configuration of FIG. 7B, the eNB 705-a and WLAN AP 705-b in FIG. 7B may not be collocated or may not otherwise be in communication with each other.

In an aspect, one or more bearers may be established for the UE 715 and a bearer serving data to the UE 715 may be switched between a first communication link that uses a first RAT (e.g., LTE or UMTS) and a second communication link that uses a second RAT (e.g., WiFi™, LTE, or UMTS), such that there is minimum interruption to the data being served to the UE 715. For example, the bearer may be switched at a time based at least in part on measurements provided by the UE 715 and/or the WLAN AP 705-b. The measurements provided by the UE 715 and/or WLAN AP 705-b may include received signal quality, buffer status, channel quality indicator (CQI) and MCS, the total radio resource utilization (e.g., frequency and/or time components of a WWAN resource) and the radio resource utilization per user, and/or hardware and backhaul loading for the WWAN. When switching the bearer from the first RAT to the second RAT, data packets which were not transmitted using a first RAT (e.g., LTE) may be forwarded for transmission using a second RAT (e.g., WiFi™)

When the UE 715 is operating in an RLC Acknowledged Mode (AM), DL transmissions carried by a bearer may include feedback messages for UL transmissions carried by the bearer, and the UL transmissions carried by the bearer may include feedback and/or control messages for the DL transmissions carried by the bearer. In an aspect, such feedback and/or control messages may be delivered using the WWAN link 746 without using the WLAN link 751, or using the WLAN link 751 without using the WWAN link 746. In an aspect, when the feedback and/or control messages are delivered on the WLAN link 751, the bearer's feedback and/or control messages may be sent from the WLAN AP 705-b to the eNB 705-a when transmitted from the UE 715, and from the eNB 705-a to the WLAN AP 705-b when transmitted from the eNB 705-a.

Figure 8:
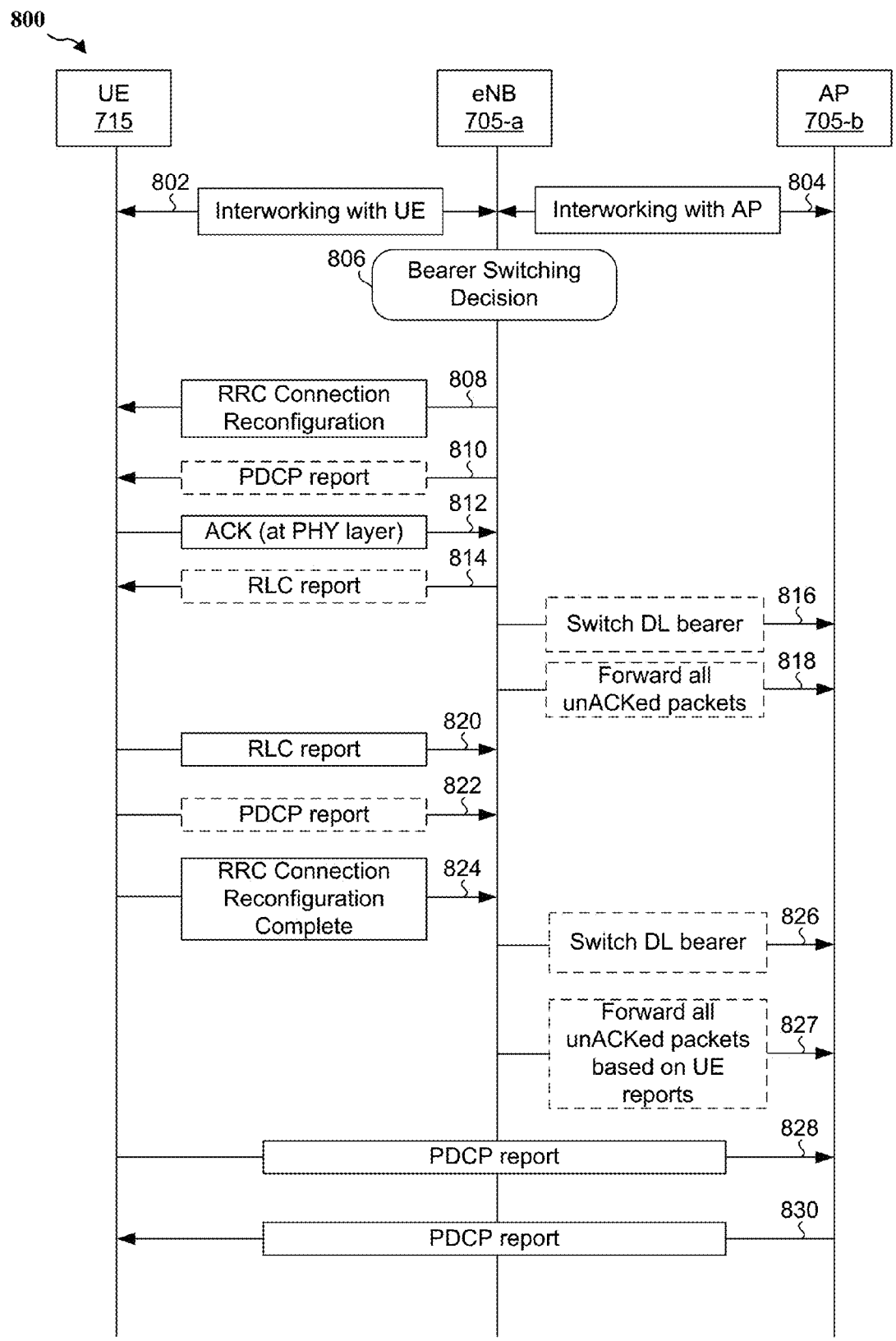
FIG. 8 is a diagram illustrating a message flow between a UE, eNB, and an access point (AP) in accordance with an aspect of the present disclosure.

FIG. 8 is a diagram 800 illustrating a message flow between the UE 715, eNB 705-a, and WLAN AP 705-b in accordance with an aspect of the present disclosure. As shown in FIG. 8, the eNB 705-a may receive information from the UE 715 (e.g., channel state information) via interworking message 802 and/or information from the WLAN AP 705-b (e.g., AP statistics) via the interworking message 804. The eNB 705-a may determine (e.g., bearer switching decision 806) whether to move a bearer serving data to the UE 715 from a first communication link that uses a first RAT (e.g., LTE) to a second communication link that uses a second RAT (e.g., WiFi™) based on the received information. For example, the received information may include CQI, Received Signal Strength Indicator (RSSI), Reference Signal Received Power (RSRP), MCS, buffer size (e.g., per bearer), buffer status report (BSR), channel load for each RAT from the UE, and/or AP. The received information may also include transmitted and received traffic, failed and/or dropped data packets, retransmission attempts, channel load and/or other information from the UE 715 and/or WLAN AP 705-b. In such aspect, the eNB 705-a may initiate a configuration procedure (e.g., an RRC Connection Reconfiguration procedure) between the eNB 705-a and the UE 715 by sending a configuration message 808 (e.g., RRCConnectionReconfigurationMessage) to the UE 715. When successful transmission of the data packet(s) carrying the configuration message 808 is confirmed by the MAC layer at the eNB 705-a upon receiving a HARQ ACK, the RLC layer at the eNB 705-a for the bearer may be reset and the bearer may be switched to the second communication link that uses the second RAT (e.g., WiFi™). The UE 715 may reset the RLC layer at the UE 715 when it receives the configuration message 808 and may be configured to accept data packets via the second communication link that uses the second RAT (e.g., WiFi™) for this bearer.

In an aspect, when a bearer is switched from a first communication link that uses a first RAT (e.g., LTE) to a second communication link that uses a second RAT (e.g., WiFi™), the eNB 705-a forwards all the PDCP packets which have not been received by the UE 715 to the WLAN AP 705-b. For example, the eNB 705-a may forward unacknowledged downlink PDCP packets to the WLAN AP 705-b and the UE 715 may send unacknowledged uplink PDCP packets to the WLAN AP 705-b. In an aspect, the eNB 705-a may forward unacknowledged downlink PDCP packets to the WLAN AP 705-b after the RLC layer is reset at the eNB 705-a and the RLC layer is reset at the UE 715 (e.g., the RLC layer at the eNB 705-a and the RLC layer at the UE 715 may reset contemporaneously). For example, the UE 715 may reset the RLC layer upon applying the configuration change. In another example, the eNB 705-a may reset the RLC layer upon receiving the reconfiguration complete message 824 (e.g., RRCConnectionReconfigurationComplete) from the UE 715 for the configuration change. In other examples, the eNB 705-a may reset the RLC layer upon the determination of switching the communication link.

In an aspect, for a bearer using RLC AM, the eNB 705-a may optimize the selection of PDCP packets that are to be transmitted. In an aspect, when the eNB 705-a determines to switch a bearer from a first communication link that uses a first RAT (e.g., LTE) to a second communication link that uses a second RAT (e.g., WiFi™), the eNB 705-a may send a PDCP status report 810 to the UE 715 via the first communication link that uses the first RAT before switching the bearer to the second communication link that uses the second RAT. For example, the eNB 705-a may initiate switching of the bearer from the first communication link that uses the first RAT to the second communication link that uses the second RAT by sending a command 816 or 826 to the WLAN AP 705-b. In another aspect, the PDCP status report 810 may be sent prior to the configuration message 808, in the configuration message 808, after receiving the ACK 812 for the configuration message 808, or after receiving the reconfiguration complete message 824 (e.g., an RRC Connection Reconfiguration Complete message). For example, the ACK 812 may be an acknowledgment received on a physical (PHY) layer of the eNB 705-a.

In an aspect, the UE 715 may send a PDCP status report 822 via the first communication link that uses the first RAT (e.g., LTE) after receiving the configuration message 808 (e.g., an RRCConnectionReconfiguration message). In such aspect, the eNB 705-a may wait for the PDCP status report 822 before sending a command (e.g., command 826) to the WLAN AP 705-b for switching the bearer. In another aspect, the UE 715 may send the PDCP status report 822 in the reconfiguration complete message 824. In another aspect, the UE 715 may send a PDCP status report (e.g., PDCP status report 828) after switching of the bear from the first communication link that uses the first RAT (e.g., LTE) to the second communication link that uses the second RAT (e.g., WiFi™). In such case, the eNB 705-a may receive the PDCP report from the UE 715 via WLAN AP 705-b. As shown in FIG. 8, the UE 715 may send a PDCP report (e.g., PDCP status report 830) to the WLAN AP 705-b.

In an aspect, the eNB 705-a may send an RLC status report 814 to the UE 715 after receiving the ACK 812 for the configuration message 808. In another aspect, the eNB 705-a may send the RLC status report 814 to the UE 715 concurrently with the configuration message 808. In an aspect, the UE 715 may send an RLC status report 820 anytime after sending the ACK 812 for the configuration message 808.

As shown in FIG. 8, in an aspect, the eNB 705-a may switch a bearer from a first communication link that uses a first RAT (e.g., LTE) to a second communication link that uses a second RAT (e.g., WiFi™) by sending the command 816 after receiving the ACK 812 for the configuration message 808. The eNB 705-a may then forward all unacknowledged packets 818 to the WLAN AP 705-b. In another aspect, the eNB 705-a may switch a bearer from a first communication link that uses a first RAT (e.g., LTE) to a second communication link that uses a second RAT (e.g., WiFi™) by sending the command 826 after receiving the reconfiguration complete message 824 (e.g., RRCConnectionReconfigurationCompleteMessage) from the UE 715. The eNB 705-a may then forward all unacknowledged packets 827 to the WLAN AP 705-b. In an aspect, the UE 715 may switch the bearer from the first communication link that uses the first RAT (e.g., LTE) to the second communication link that uses the second RAT (e.g., WiFi™) after receiving the configuration message 808 or after receiving an RLC status report (e.g., RLC status report 814) and/or a PDCP status report (e.g., PDCP status report 810). A timer may be initiated by the UE 715 upon sending the ACK 812, such that the UE 715 waits for the RLC status report (e.g., RLC status report 814) and/or a PDCP status report until expiration of the timer before resetting the RLC and/or PDCP.

Figure 9:
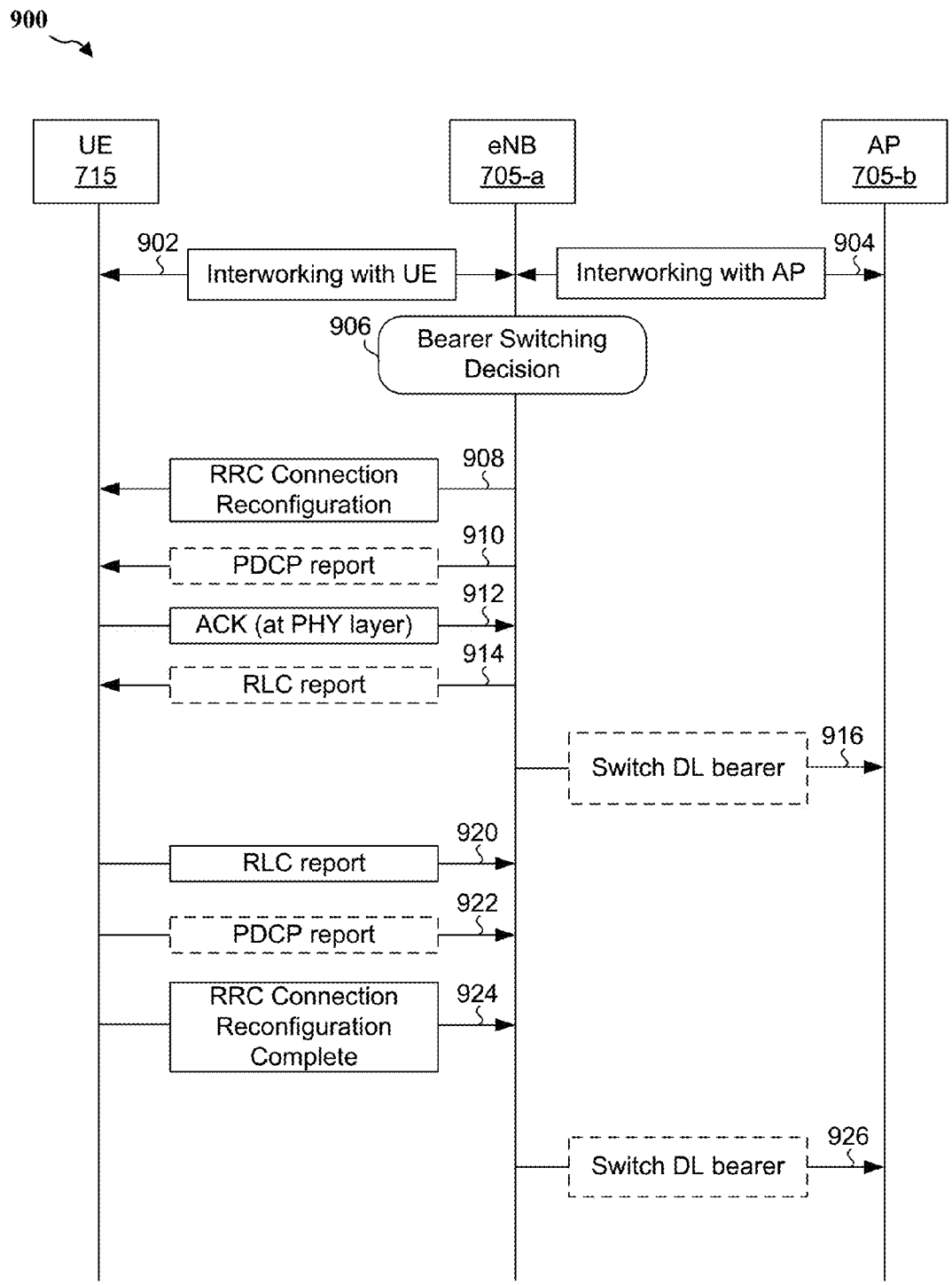
FIG. 9 is a diagram illustrating a message flow between a UE, eNB, and an AP in accordance with an aspect of the present disclosure.

FIG. 9 is a diagram 900 illustrating a message flow between the UE 715, eNB 705-a, and WLAN AP 705-b in accordance with an aspect of the present disclosure. As shown in FIG. 9, the eNB 705-a may receive information from the UE 715 (e.g., channel state information) via interworking message 902 and/or information from the WLAN AP 705-b (e.g., AP statistics) via the interworking message 904. The eNB 705-a may determine (e.g., bearer switching decision 906) whether to move a bearer serving data to the UE 715 from a first communication link that uses a first RAT (e.g., WiFi™) to a second communication link that uses a second RAT (e.g., LTE) based on the received information. For example, the received information may include CQI, RSSI, RSRP, MCS, buffer size (e.g., per bearer), buffer status report (BSR), channel load for each RAT from the UE 715 and/or WLAN AP 705-b. The received information may also include transmitted and received traffic, failed and/or dropped data packets, retransmission attempts, channel load and/or other information from the UE 715 and/or WLAN AP 705-b. In such aspect, the eNB 705-a may initiate a configuration procedure (e.g., an RRC Connection Reconfiguration procedure) between the eNB 705-a and the UE 715 by sending a configuration message 908 (e.g., RRCConnectionReconfigurationMessage) to the UE 715. When successful transmission of the data packet(s) carrying the configuration message 908 is confirmed by the MAC layer at the eNB 705-a upon receiving an HARQ ACK, the RLC layer at the eNB 705-a for the bearer may be reset and the bearer may be switched to the second communication link that uses the second RAT (e.g., LTE). The UE 715 may reset the RLC layer at the UE 715 when it receives the configuration message 908 and may be configured to accept data packets via the second communication link that uses the second RAT (e.g., LTE) for this bearer.

In an aspect, the UE 715 may reset the RLC layer upon applying the configuration change. In another example, the eNB 705-a may reset the RLC layer upon receiving confirmation (e.g., RRCConnectionReconfigurationComplete 924) from the UE 715 for the configuration change. In other examples, the eNB 705-a may reset the RLC layer upon the determination of switching the communication link.

In an aspect, for a bearer using RLC AM, the eNB 705-a may optimize the selection of PDCP packets that are to be transmitted. In an aspect, when the eNB 705-a determines to switch a bearer from a first communication link that uses a first RAT (e.g., WiFi™) to a second communication link that uses a second RAT (e.g., LTE), the eNB 705-a may send a PDCP status report 910 to the UE 715 via the first communication link that uses the first RAT before switching the bearer to the second communication link that uses the second RAT. For example, the eNB 705-a may initiate switching of the bearer from the first communication link that uses the first RAT to the second communication link that uses the second RAT by sending a command 916 or 926 to the WLAN AP 705-b. The WLAN AP 705-b may stop transmitting data upon receiving the command 916 or 926. In another aspect, the PDCP status report 910 may be sent prior to the configuration message 908, in the configuration message 908, after receiving the ACK 912 for the configuration message 908, or after receiving the reconfiguration complete message 924 (e.g., an RRC Connection Reconfiguration Complete message). For example, the ACK 912 may be an acknowledgment received on a physical (PHY) layer of the eNB 705-a.

In an aspect, the UE 715 may send a PDCP status report 922 via the first communication link that uses the first RAT (e.g., WiFi™) after receiving the configuration message 908 (e.g., an RRCConnectionReconfiguration message). In such aspect, the eNB 705-a may wait for the PDCP status report 922 before sending a command (e.g., command 926) to the WLAN AP 705-b for switching the bearer. In another aspect, the UE 715 may send the PDCP status report 922 in the reconfiguration complete message 924. In another aspect, the UE 715 may send a PDCP status report after switching of the bearer from the first communication link that uses the first RAT (e.g., WiFi™) to the second communication link that uses the second RAT (e.g., LTE). In such case, the eNB 705-a may receive the PDCP report from the UE 715 via WLAN AP 705-b.

In an aspect, the eNB 705-a may send an RLC status report 914 to the UE 715 after receiving the ACK 912 for the configuration message 908. In another aspect, the eNB 705-a may send the RLC status report 914 to the UE 715 concurrently with the configuration message 908. In an aspect, the UE 715 may send an RLC status report 920 anytime after sending the ACK 912 for the configuration message 908.

As shown in FIG. 9, in an aspect, the eNB 705-a may switch a bearer from a first communication link that uses a first RAT (e.g., WiFi™) to a second communication link that uses a second RAT (e.g., LTE) by sending the command 916 after receiving the ACK 912 for the configuration message 908. In an aspect, the eNB 705-a may switch a bearer from a first communication link that uses a first RAT (e.g., WiFi™) to a second communication link that uses a second RAT (e.g., LTE) by sending the command 926 after receiving the reconfiguration complete message 924 (e.g., RRCConnectionReconfigurationCompleteMessage) from the UE

715. In an aspect, the UE 715 may switch the bearer from the first communication link that uses the first RAT (e.g., WiFi™) to the second communication link that uses the second RAT (e.g., LTE) after receiving the configuration message 908 or after receiving an RLC status report (e.g., RLC status report 914) and/or a PDCP status report (e.g., PDCP status report 910). A timer may be initiated by the UE 715 upon sending the ACK 912, such that the UE 715 waits for the RLC status report (e.g., RLC status report 914) and/or a PDCP status report until expiration of the timer before resetting the RLC and/or PDCP.

In an aspect, when the eNB 705-a determines to switch a bearer from a first communication link that uses a first RAT (e.g., WiFi™) to a second communication link that uses a second RAT (e.g., LTE), the eNB 705-a may forward all the PDCP packets which have not been pushed to the driver of the first RAT (e.g., WiFi™) to the second RAT (e.g., LTE). In another aspect, when the eNB 705-a determines to switch a bearer from a first communication link that uses a first RAT (e.g., WiFi™) to a second communication link that uses a second RAT (e.g., LTE), the eNB 705-a may store local copies of PDCP packets. In such aspect, the eNB 705-a may retransmit PDCP packets that have not been successfully transmitted on the first communication link that uses the first RAT (e.g., WiFi™) on the second communication link that uses the second RAT (e.g., LTE) after the switch. In such aspect, a feedback mechanism from the WLAN AP 705-b to the eNB 705-a may be implemented for unacknowledged packets.

In an aspect, duplicate PDCP packets may arrive at the UE 715 if the WLAN AP 705-b continues to transmit PDCP packets in its buffers after the bearer is switched to the second RAT. In such aspect, the duplication may be corrected by high protocol layers (e.g., higher than the PDCP layer) or by signaling on an inter-connection between LTE and WiFi™ within eNB 705-a/WLAN AP 705-b or an inter-connection between LTE and WiFi™ within UE 715 to cease transmissions for the switched bearers.

In an aspect, the eNB 705-a may determine to switch the bearer from a first communication link that uses a first RAT, such as WiFi™, to a second communication link that uses a second RAT, such as LTE. In such aspect, PDCP status reports may be exchanged between the UE 715 and the eNB 705-a using a WiFi™ link before the data bearer is switched. In such aspect, RLC status reports may be exchanged using either an LTE link or the WiFi™ link. In an aspect, RRC messages may be exchanged between the UE 715 and the eNB 705-a using only the LTE link. In another aspect, RRC messages may be exchanged between the UE 715 and the eNB 705-a using the LTE link and/or the WiFi™ link.

In the aspects discussed herein, the bearer switching may be performed by the eNB 705-a above the PDCP layer. In other aspects, the bearer switching may be performed by the eNB 705-a at the PDCP layer. The RLC layer for a bearer can be used on both RAT links or it can be used only on the LTE link.

Figure 10A:
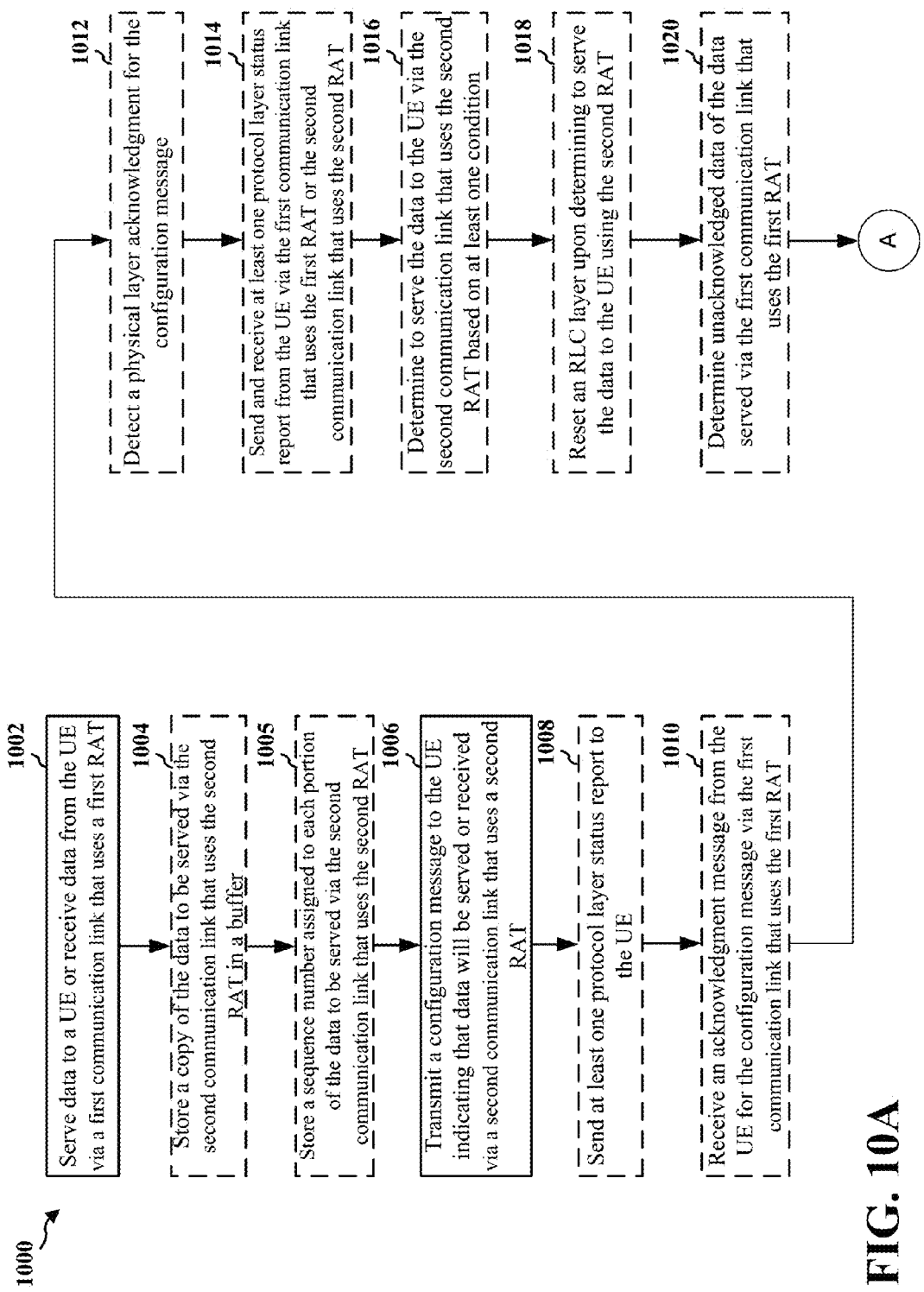
FIGS. 10A and 10B is a flow chart of a method of wireless communication in accordance with an aspect of the present disclosure.
Figure 10B:
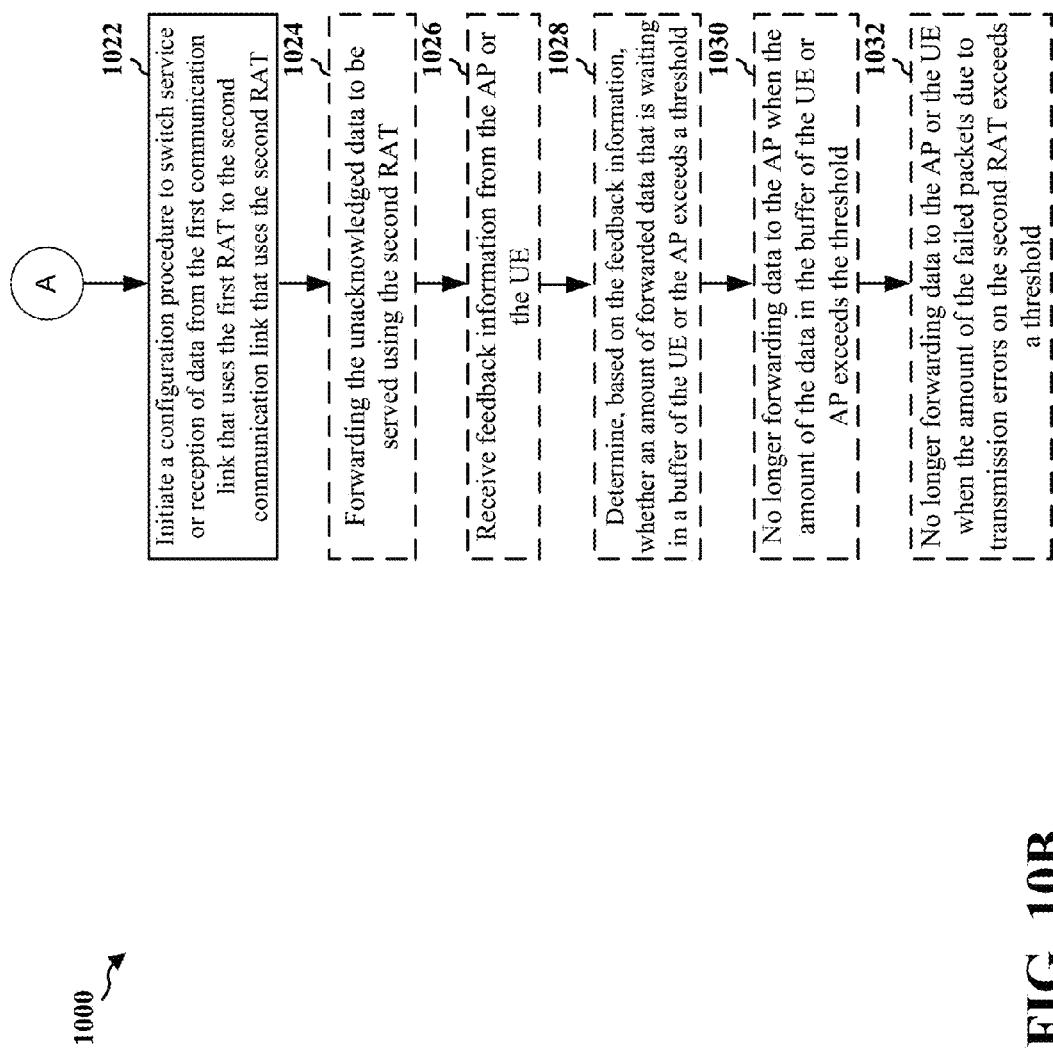

FIGS. 10A and 10B is a flow chart 1000 of a method of wireless communication in accordance with an aspect of the present disclosure. The method may be performed by an eNB, such as eNB 705-a. It should be understood that the steps indicated with dotted lines in FIGS. 10A and 10B represent optional steps. At step 1002, the eNB serves data (e.g., data packets) to a UE, such as UE 715, or receives data from the UE via a first communication link that uses a first RAT (e.g., LTE).

At step 1004, the eNB stores a copy of the data to be served via a second communication link that uses a second RAT (e.g., WiFi™) in a buffer.

At step 1005, the eNB stores a sequence number assigned to each data packet to be served via the second communication link that uses the second RAT. For example, the eNB may assign a sequence number to the data packet to be served via the first communication link that uses the first RAT and a sequence number to the data packet to be served via the second communication link that uses the second RAT. The eNB may map the sequence number of the data packet to be served via the first communication link that uses the first RAT to the sequence number of the data packet to be served via the second communication link that uses the second RAT.

At step 1006, the eNB transmits a configuration message to the UE indicating that data will be served or received via the second communication link that uses the second RAT. In an aspect, the configuration message includes a request for a status report (e.g., an RLC layer status report and/or a PDCP layer status report) from the UE.

At step 1008, the eNB sends at least one protocol layer status report to the UE. In an aspect, the eNB sends the at least one protocol layer status report to the UE via the first communication link that uses the first RAT or the second communication link that uses the second RAT. For example, the at least one protocol layer status report may be a PDCP layer status report or an RLC layer status report. In an aspect, the at least one protocol layer status report is sent to the UE concurrently with the configuration message or within the configuration message At step 1010, the eNB receives an acknowledgment message from the UE for the configuration message via the first communication link that uses the first RAT. In an aspect, the acknowledgment message from the UE may indicate that a reconfiguration of an RRC layer of the UE is completed and that the UE is configured to receive data via the second RAT. In an aspect, the eNB may perform step 1008 after step 1010. For example, the eNB may send at least one protocol layer status report to the UE after receiving an acknowledgment message from the UE for the configuration message.

At step 1012, the eNB detects a physical layer acknowledgment for the configuration message. In an aspect, the eNB may perform step 1008 after step 1012. For example, the eNB may send at least one protocol layer status report to the UE after detecting a physical layer acknowledgment from the UE for the configuration message.

At step 1014, the eNB sends and receives at least one protocol layer status report from the UE via the first communication link that uses the first RAT or the second communication link that uses the second RAT. In an aspect, the at least one protocol layer status report is received through an AP when the at least one protocol layer status report is received via the second RAT.

At step 1016, the eNB determines to serve the data to the UE using the second communication link that uses the second RAT (e.g., WiFi™) based on at least one condition. In an aspect, the at least one condition may be reception of a physical layer acknowledgment, reception of an RRC message in response to the configuration message, or expiration of a timer that is started upon transmission of the configuration message.

At step 1018, the eNB resets an RLC layer upon determining to serve the data to the UE using the second RAT.

At step 1020, the eNB determines unacknowledged data (e.g., unacknowledged data packets) of the data served using the first RAT. In an aspect, the at least one protocol layer status report received from the UE in step 1014 identifies data received by the UE via the first RAT, wherein the unacknowledged data is determined based on the at least one protocol layer status report.

At step 1022, the eNB initiates a configuration procedure to switch service or reception of data from the first communication link that uses the first RAT to the second communication link that uses the second RAT.

At step 1024, the eNB forwards the unacknowledged data to be served via the second communication link that uses the second RAT. In an aspect, the unacknowledged data is forwarded in response to the acknowledgment message received in step 1010. In another aspect, the unacknowledged data is forwarded in response to the detected physical layer acknowledgment in step 1012.

At step 1026, the eNB receives feedback information from the AP or the UE. In an aspect, the feedback information indicates an amount of successfully transmitted and failed data packets. In an aspect, the feedback from the WLAN AP 705-b may include one or more sequence numbers of packets which were successfully transmitted. In such aspect, the eNB may use the feedback to identify the packets which were not successfully transmitted by the AP.

At step 1028, the eNB determines, based on the feedback information, whether an amount of forwarded data that is waiting in a buffer of the UE or the AP exceeds a threshold.

At step 1030, the eNB no longer forwards data to the AP when the amount of the data in the buffer of the UE or AP exceeds the threshold.

Finally, at step 1032, the eNB no longer forwards data to the AP or the UE when the amount of failed packets due to transmission errors on the second communication link that uses the second RAT exceeds a threshold.

Figure 11:
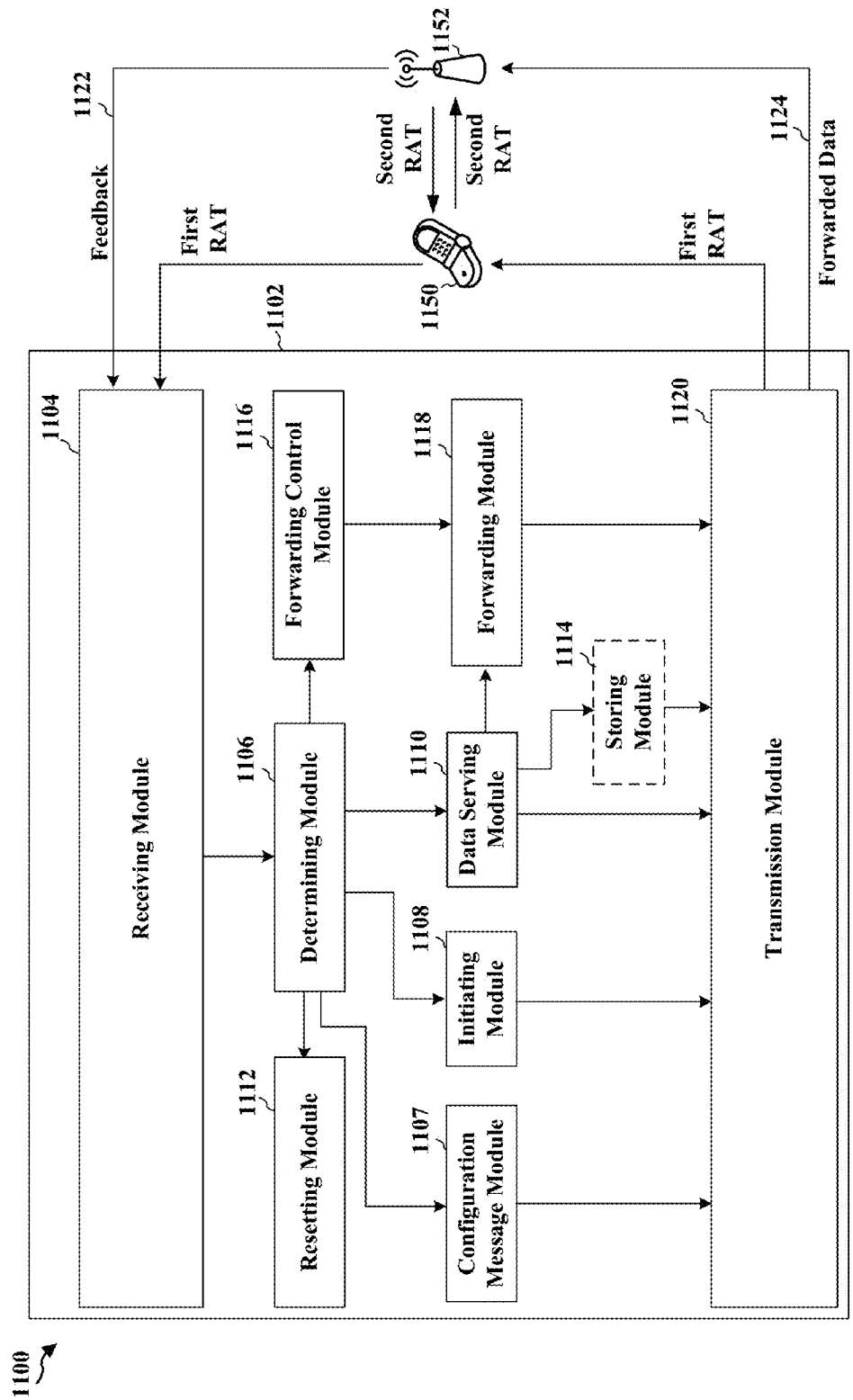
FIG. 11 is a conceptual data flow diagram illustrating the data flow between different modules/means/components, in accordance with various aspects of the present disclosure.

FIG. 11 is a conceptual data flow diagram 1100 illustrating the data flow between different modules/means/components in an exemplary apparatus 1102 in accordance with various aspects of the present disclosure. The apparatus may be an eNB. The apparatus includes a receiving module 1104 that receives an acknowledgment message from the UE for the configuration message via the first communication link that uses the first RAT, receives at least one protocol layer status report from the UE (e.g., UE 1150) via the first communication link that uses the first RAT or the second communication link that uses the second RAT, and receives feedback information (e.g. feedback 1122) from the AP (e.g., AP 1152) or the UE, a module 1106 that determines to serve the data to the UE via a second communication link that uses a second RAT (e.g., WiFi™) based on at least one condition, determines unacknowledged data (e.g., unacknowledged data packets) of the data served via the first communication link that uses the first RAT, determines, based on feedback information (e.g., feedback 1122), whether an amount of forwarded data (e.g., forwarded data 1124) that is waiting in a buffer of the UE or the AP exceeds a threshold, and detects a physical layer acknowledgment for the configuration message, a module 1107 that transmits a configuration message to the UE indicating that the data will be served via a second communication link that uses a second RAT, a module 1108 that initiates a configuration procedure to switch service of the data from the first communication link that uses the first RAT to the second communication link that uses the second RAT, a module 1110 that serves data (e.g., data packets) to the UE via a first communication link that uses a first RAT (e.g., LTE), a module 1112 that resets an RLC layer upon determining to serve the data to the UE using the second RAT, a module 1114 that stores a copy of the data to be served via the second communication link that uses the second RAT in a buffer, a module 1116 that no longer forwards data to the AP when the amount of the data in the AP buffer exceeds the threshold and no longer forwards data to the AP or the UE when the amount of failed packets due to transmission errors on the second communication link that uses the second RAT exceeds a threshold, a module 1118 that forwards the unacknowledged data (e.g., forwarded data 1124) to be served using the second RAT, and a transmission module 1120 that sends at least one protocol layer status report to the UE using the first RAT or the second RAT.

The apparatus may include additional modules that perform each of the steps of the algorithm in the aforementioned flow chart of FIGS. 10A and 10B. As such, each step in the aforementioned flow charts of FIGS. 10A and 10B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
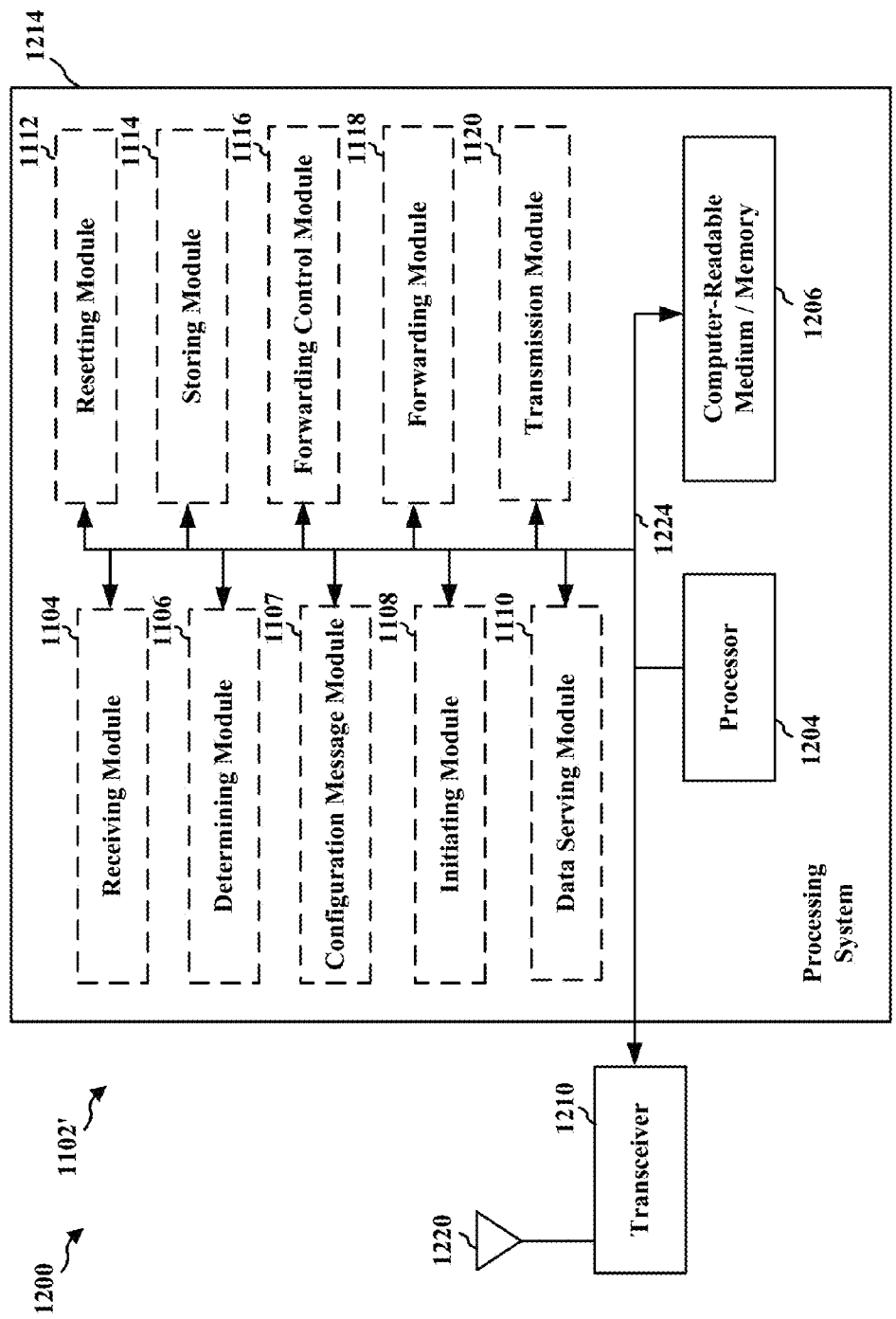
FIG. 12 is a diagram illustrating an example of a hardware implementation for an apparatus employing a processing system, in accordance with various aspects of the present disclosure.

FIG. 12 is a diagram 1200 illustrating an example of a hardware implementation for an apparatus 1102' employing a processing system 1214 in accordance with various aspects of the present disclosure. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1107, 1108, 1110, 1112, 1114, 1116, 1118, and 1120, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1120, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1107, 1108, 1110, 1112, 1114, 1116, 1118, and 1120. The modules may be software modules running in the processor 1204, resident/stored in the computer readable medium/memory 1206, one or more hardware modules coupled to the processor 1204, or some combination thereof. The processing system 1214 may be a component of the eNB 610 and may include the memory 676 and/or at least one of the TX processor 616, the RX processor 670, and the controller/processor 675.

In one configuration, the apparatus 1102/1102' for wireless communication includes means for serving data to a UE via a first communication link that uses a first RAT, means for transmitting a configuration message to the UE indicating that the data will be served via a second communication link that uses a second RAT, means for initiating a configuration procedure to switch service of the data from the first communication link that uses the first RAT to the second communication link that uses the second RAT, means for determining unacknowledged data of the data served using the first RAT, means for forwarding the unacknowledged data to be served using the second RAT, means for determining to serve the data using the second RAT based on at least one condition, means for resetting a radio link control (RLC) layer upon determining to serve the data using the second RAT, means for receiving at least one protocol layer status report from the UE, means for receiving an acknowledgment message from the UE for the configuration message via the first communication link that uses the first RAT, means for receiving an acknowledgment from the UE for the configuration message, means for detecting a physical layer acknowledgment for the configuration message, means for sending at least one protocol layer status report to the UE, means for receiving feedback information from the AP, wherein the feedback information indicates the status for successfully transmitted and failed data packets, means for storing a copy of the data to be served via the second communication link that uses the second RAT in a buffer, means for receiving feedback information from an AP or the UE for a status of transmission success of packets, means for determining, based on the feedback information, whether an amount of forwarded data that is waiting in a buffer of the UE or the AP exceeds a threshold, means for no longer forwarding data to the AP when the amount of the data in the AP buffer exceeds the threshold, means for sending and receiving at least one protocol layer status report to and from the UE via the first communication link that uses the first RAT or the second communication link that uses the second RAT, means for no longer forwarding data to the AP or the UE when the amount of failed packets due to transmission errors on the second communication link that uses the second RAT exceeds a threshold. The aforementioned means may be one or more of the aforementioned modules of the apparatus 1102 and/or the processing system 1214 of the apparatus 1002' configured to perform the functions recited by the aforementioned means. As described supra, the processing system 1214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 13A:
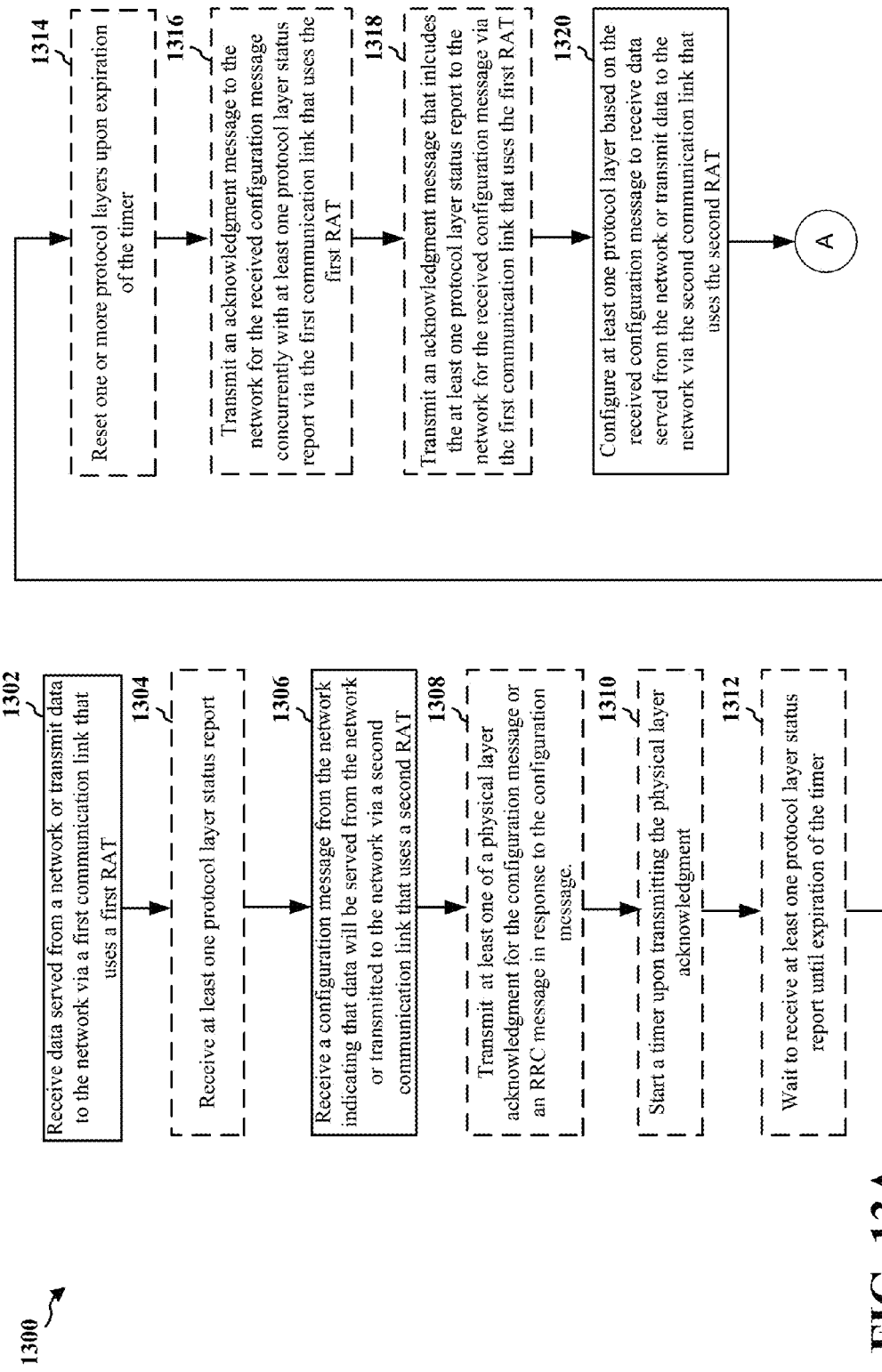
FIGS. 13A and 13B is a flow chart of a method of wireless communication in accordance with an aspect of the present disclosure.
Figure 13B:
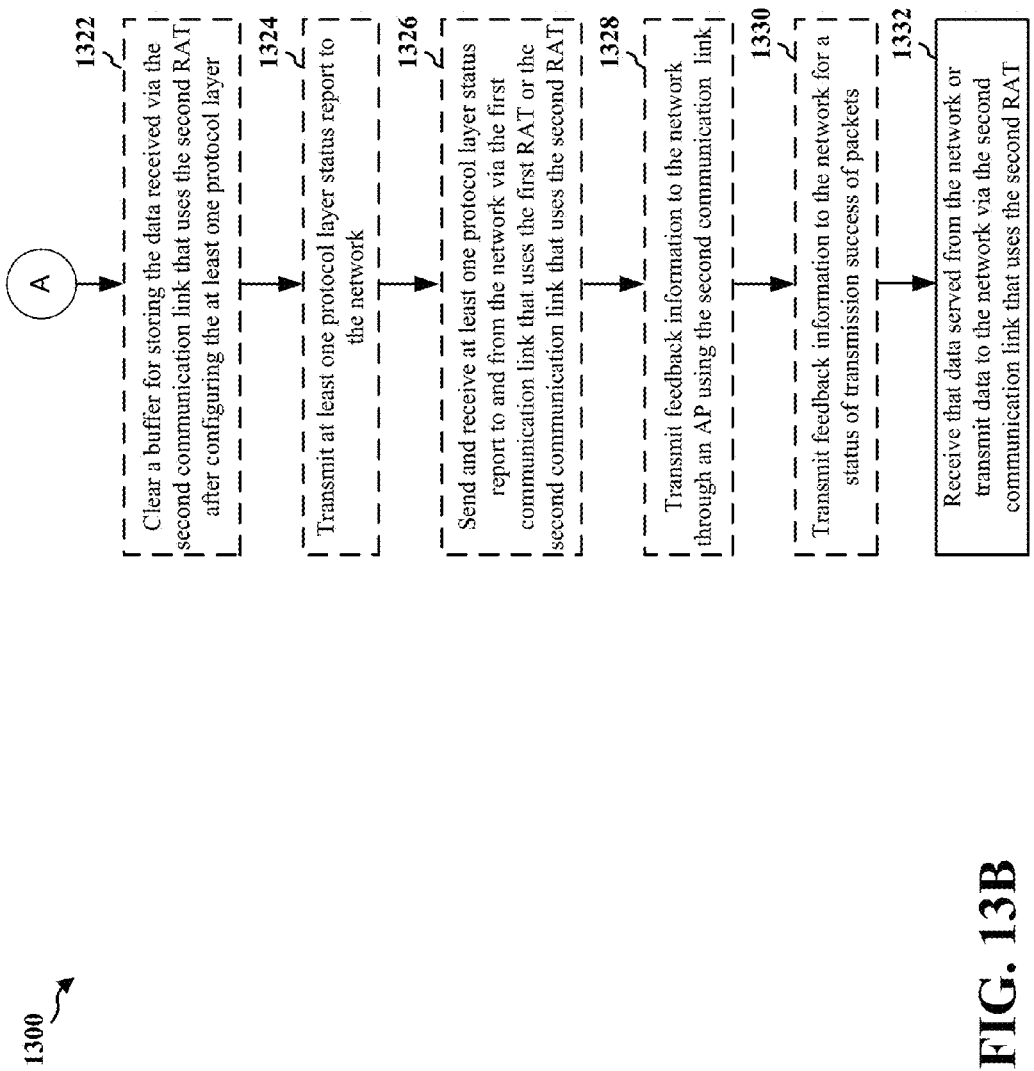

FIGS. 13A and 13B are a flow chart 1300 of a method of wireless communication in accordance with an aspect of the present disclosure. It should be understood that the steps indicated with dotted lines in FIGS. 13A and 13B represent optional steps. The method may be performed by a UE (e.g., UE 715, apparatus 1402/1402'). At step 1302, the UE receives data served from a network (e.g., eNB 705-a) or transmits data to the network (e.g., eNB 705-a) via a first communication link that uses a first RAT (e.g., LTE).

At step 1304, the UE receives at least one protocol layer status report. For example, with reference to FIG. 8, the UE 715 may receive PDCP status report 810. In an aspect, the at least one protocol layer status report is received via the first communication link that uses a first RAT or a second communication link that uses a second first RAT (e.g., WiFi™). For example, the at least one protocol layer status report may include PDCP layer status report and/or an RLC layer status report (e.g., RLC status report 814 in FIG. 8).

At step 1306, the UE receives a configuration message from the network indicating that data will be served from the network or transmitted to the network via a second communication link that uses a second RAT. For example, with reference to FIG. 8, the UE 715 receives the configuration message 808 (e.g., RRC Connection Reconfiguration message). In an aspect, the configuration message includes a data status report and/or a request for a data status report. In an aspect, the at least one protocol layer status report is received concurrently with the configuration message or within the configuration message. In an aspect, the at least one protocol layer status report is received via the first RAT either concurrently with the configuration message, after transmission of a physical layer acknowledgment to the network for the configuration message, or after transmission of an acknowledgment message to the network for the configuration message.

At step 1308, the UE transmits a physical layer acknowledgment for the configuration message and/or an RRC message in response to the configuration message. For example, with reference to FIG. 8, the UE transmits ACK 812 to the eNB 705a.

At step 1310, the UE starts timer upon transmitting the physical layer acknowledgement for the configuration message.

At step 1312, the UE waits to receive at least one protocol layer status report until expiration of the timer.

At step 1314, the UE resets one or more protocol layers upon expiration of the timer.

At step 1316, the UE transmits an acknowledgment message to the network for the received configuration message concurrently with at least one protocol layer status report via the first communication link that uses the first RAT.

At step 1318, the UE transmits an acknowledgment message that includes the at least one protocol layer status report to the network for the received configuration message via the first communication link that uses the first RAT.

At step 1320, the UE configures at least one protocol layer based on the received configuration message to receive the data served from the network or transmit data to the network via the second communication link that uses the second RAT.

At step 1322, the UE may clear a buffer for storing the data to be sent via the second communication link that uses the second RAT after configuring the at least one protocol layer after it is switched to the first RAT.

At step 1324, the UE transmits at least one protocol layer status report to the network. For example, with reference to FIG. 8, the UE 715 transmits PDCP status report 822. In an aspect, the at least one protocol layer status report identifies data received by the UE via the first RAT. In an aspect, the at least one protocol layer status report is transmitted via the first communication link that uses the first RAT. In an aspect, the at least one protocol layer status report includes a PDCP layer status report and/or an RLC layer status report. In an aspect, the at least one protocol layer status report is sent to the network through an AP when the at least one protocol layer status report is sent via the second communication link that uses the second RAT.

At step 1326, the UE sends and receives at least one protocol layer status report to and from the network via the first communication link that uses the first RAT or the second communication link that uses the second RAT.

At step 1328, the UE transmits feedback information to the network through a WLAN AP (e.g., WLAN AP 705-b) using the second communication link. In an aspect, the feedback information indicates the status for successfully transmitted and failed data packets.

At step 1330, the UE transmits feedback information to the network for a status of transmission success of packets.

Finally, at step 1332, the UE receives the data served from the network or transmits data to the network via the second communication link that uses the second RAT.

Figure 14:
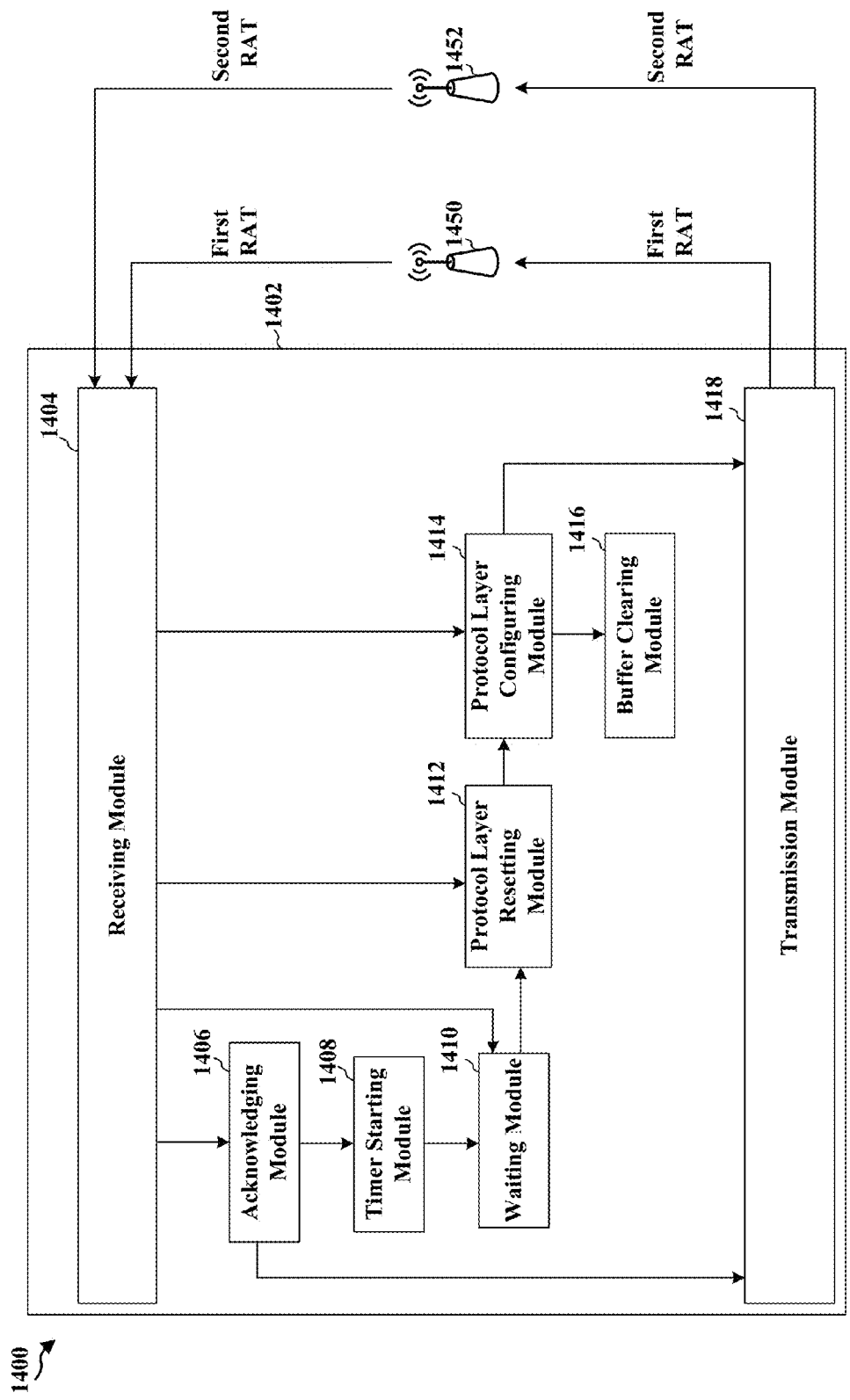
FIG. 14 is a conceptual data flow diagram illustrating the data flow between different modules/means/components, in accordance with various aspects of the present disclosure.

FIG. 14 is a conceptual data flow diagram 1400 illustrating the data flow between different modules/means/components in an exemplary apparatus 1402. The apparatus may be a UE. The apparatus includes a module 1404 that receives data served from a network, receives a configuration message from the network indicating that data will be served from the network or transmitted to the network via a second communication link that uses a second RAT, receives the data served from the network via the second communication link that uses the second RAT, receives at least one protocol layer status report.

The apparatus further includes a module 1414 that configures at least one protocol layer based on the received configuration message to receive the data served from the network or transmit data to the network via the second communication link that uses the second RAT.

The apparatus further includes a transmission module 1418 that transmits data to the network via a first communication link that uses a first RAT, transmits at least one of a physical layer acknowledgment for the configuration message or an RRC message in response to the configuration message, transmits at least one protocol layer status report to the network, the at least one protocol layer status report identifying data received by the UE via the first RAT or second RAT, transmits feedback information to the network through an AP using the second communication link, wherein the feedback information indicates the status for successfully transmitted and failed data packets, transmits feedback information to the network for a status of transmission success of packets, and sends and receiving at least one protocol layer status report to and from the network via the first communication link that uses the first RAT or the second communication link that uses the second RAT.

The apparatus further includes a module 1408 that starts a timer upon transmitting the physical layer acknowledgement.

The apparatus further includes a module 1410 that waits to receive at least one protocol layer status report until expiration of the timer.

The apparatus further includes a module 1412 that resets one or more protocol layers upon expiration of the timer.

The apparatus further includes a module 1416 that clears a buffer for storing the data received via the second communication link that uses the second RAT after configuring the at least one protocol layer.

The apparatus further includes a module 1418 that transmits data to the network via the second communication link that uses the second RAT.

The apparatus may include additional modules that perform each of the blocks of the algorithm in the aforementioned flow chart of FIGS. 13A and 13B. As such, each block in the aforementioned flow charts of FIGS. 13A and 13B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
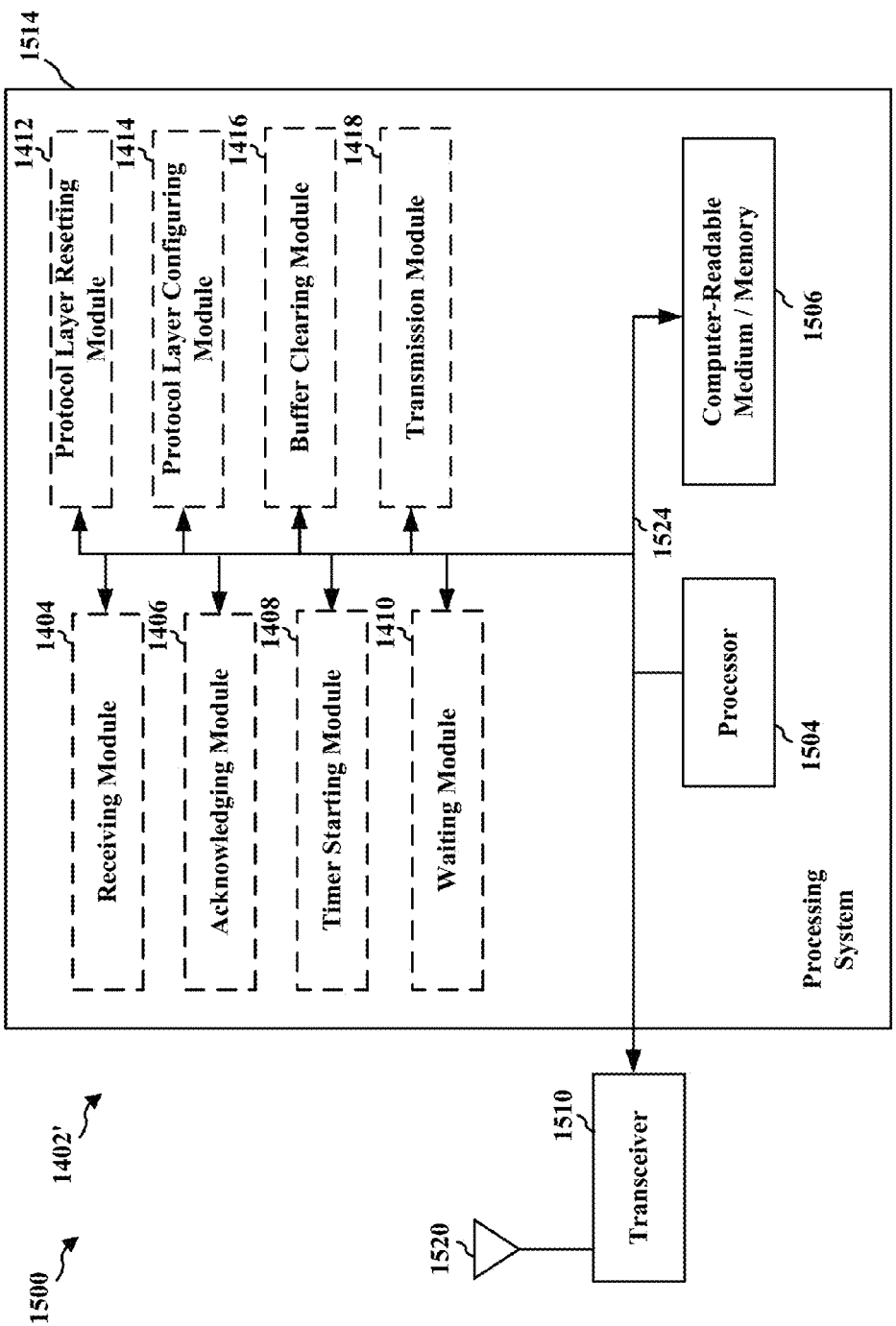
FIG. 15 is a diagram illustrating an example of a hardware implementation for an apparatus employing a processing system, in accordance with various aspects of the present disclosure.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, 1414, 1416, and 1418, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception module 1401. In addition, the transceiver 1510 receives information from the processing system 1514, specifically the transmission module 1418, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, 1412, 1414, 1416, and 1418. The modules may be software modules running in the processor 1504, resident/stored in the computer readable medium/memory 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for means for receiving data served from a network or transmitting data to the network via a first communication link that uses a first RAT, means for receiving a configuration message from the network indicating that data will be served from the network or transmitted to the network via a second communication link that uses a second RAT, means for configuring at least one protocol layer based on the received configuration message to receive the data served from the network or transmit data to the network via the second communication link that uses the second RAT, means for receiving the data served from the network or transmitting data to the network via the second communication link that uses the second RAT, means for transmitting at least one of a physical layer acknowledgment for the configuration message or an RRC message in response to the configuration message, means for starting a timer upon transmitting the physical layer acknowledgement, means for waiting to receive at least one protocol layer status report until expiration of the timer, means for resetting one or more protocol layers upon expiration of the timer, means for clearing a buffer for storing the data received via the second communication link that uses the second RAT after configuring the at least one protocol layer, means for transmitting at least one protocol layer status report to the network, the at least one protocol layer status report identifying data received by the UE via the first RAT or second RAT, means for sending the at least one protocol layer status report on a configuration acknowledgment message or another signaling message, means for sending the at least one protocol layer status report on a data bearer that is being switched, means for sending the at least one protocol layer status report on another data bearer that is not being switched and that is served by either the first communication link that uses the first RAT or the second communication link that uses the second RAT, means for transmitting an acknowledgment message to the network for the received configuration message concurrently with at least one protocol layer status report via the first communication link that uses the first RAT, or means for transmitting an acknowledgment message that includes the at least one protocol layer status report to the network for the received configuration message via the first communication link that uses the first RAT, means for receiving at least one protocol layer status report, means for transmitting feedback information to the network through an AP using the second communication link, wherein the feedback information indicates the status for successfully transmitted and failed data packets, means for transmitting feedback information to the network for a status of transmission success of packets, means for sending and receiving at least one protocol layer status report to and from the network via the first communication link that uses the first RAT or the second communication link that uses the second RAT. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 16:
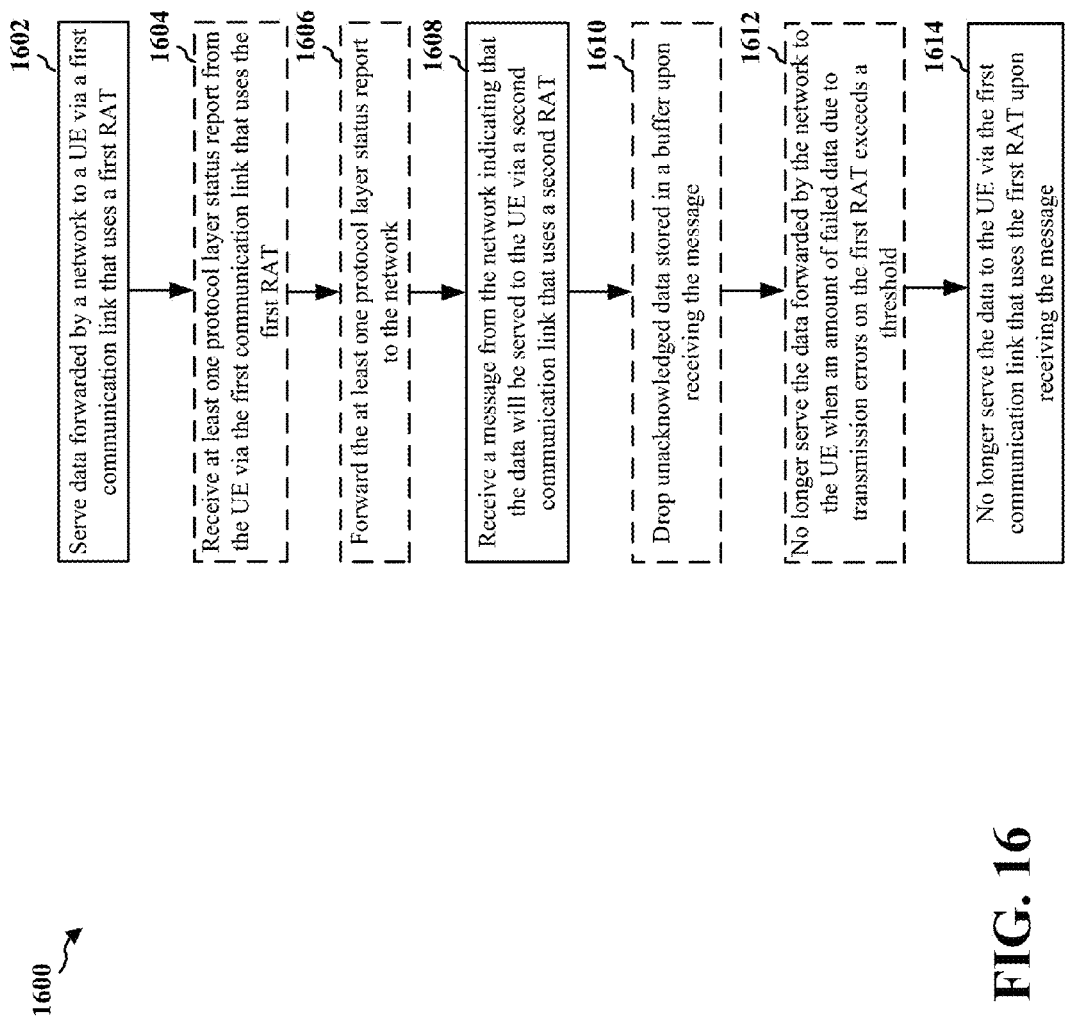
FIG. 16 is a flow chart of a method of wireless communication in accordance with an aspect of the present disclosure.

FIG. 16 is a flow chart 1600 of a method of wireless communication in accordance with an aspect of the present disclosure. The method may be performed by an AP (e.g., WLAN AP 705-b, apparatus 1702/1702'). It should be understood that the steps indicated with dotted lines in FIG. 16 represent optional steps. At step 1602, the AP serves data forwarded by a network to a UE via a first communication link that uses a first RAT (e.g., WiFi™).

At step 1604, the AP receives at least one protocol layer status report from the UE via the first communication link that uses the first RAT.

At step 1606, the AP forwards the at least one protocol layer status report to the network.

At step 1608, the AP receives a message from the network indicating that the data will be served to the UE via a second communication link that uses a second RAT (e.g., LTE).

At step 1610, the AP drops unacknowledged data stored in a buffer upon receiving the message.

At step 1612, the AP no longer serves the data forwarded by the network to the UE when an amount of failed data due to transmission errors on the first RAT exceeds a threshold.

Finally, at step 1614, the AP no longer serves the data to the UE via the first communication link that uses the first RAT upon receiving the message.

Figure 17:
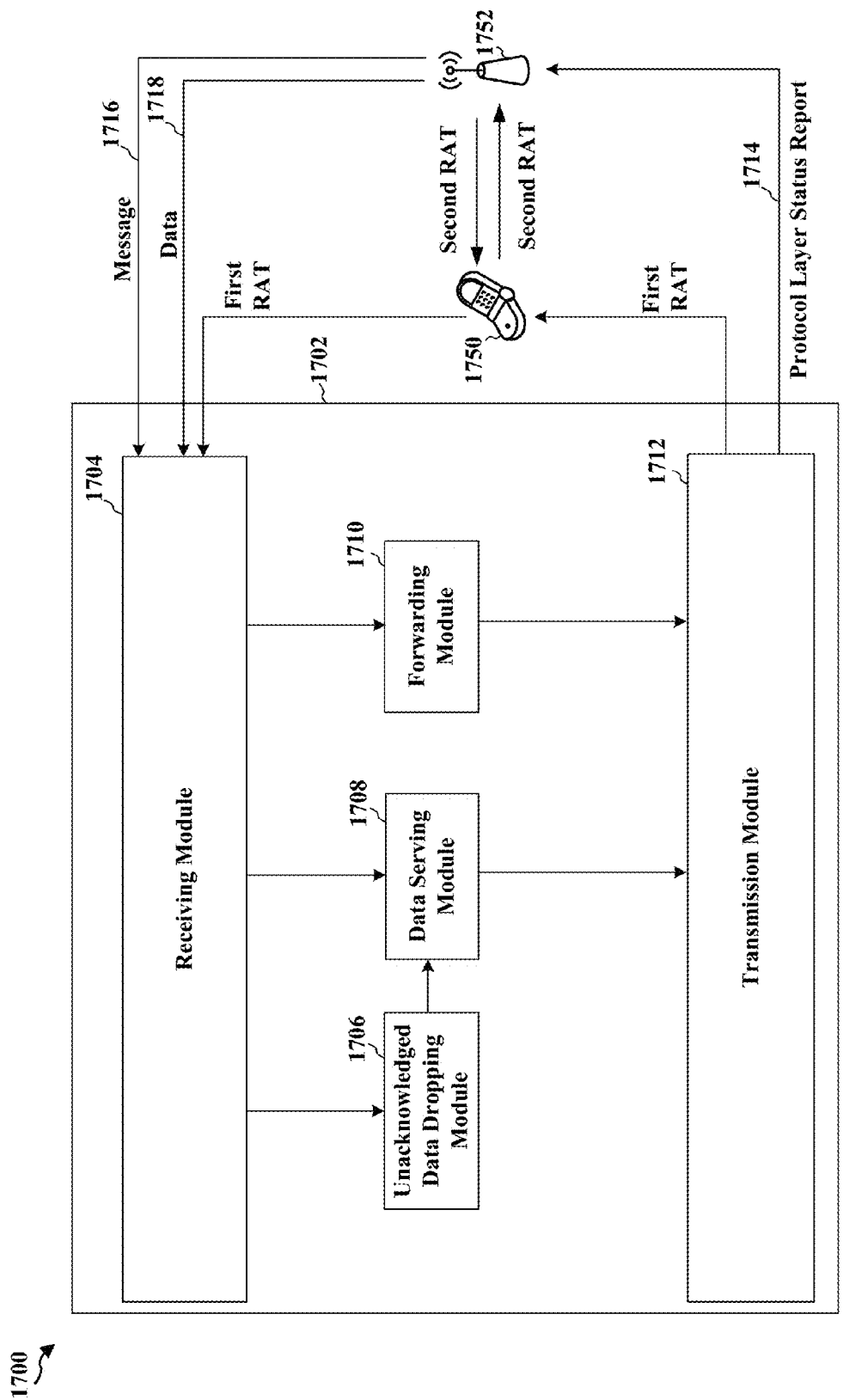
FIG. 17 is a conceptual data flow diagram illustrating the data flow between different modules/means/components, in accordance with various aspects of the present disclosure.

FIG. 17 is a conceptual data flow diagram 1700 illustrating the data flow between different modules/means/components in an exemplary apparatus 1702. The apparatus may be an AP. The apparatus includes a reception module 1704 that receives a message (e.g., message 1716) from the network (e.g., eNB 1752) indicating that the data will be served to the UE 1750 via a second communication link that uses a second RAT, and receives at least one protocol layer status report from the UE via the first communication link that uses the first RAT. The apparatus further includes a module 1706 that drops unacknowledged data stored in a buffer upon receiving the message. The apparatus further includes a module 1708 that serves data (e.g., data 1718) forwarded by a network to the UE 1750 via a first communication link that uses a first RAT, no longer serves the data to the UE 1750 via the first communication link that uses the first RAT upon receiving the message, and no longer serves the data forwarded by the network to the UE when an amount of failed data due to transmission errors on the first RAT exceeds a threshold. The apparatus further includes a transmission module 1712 that sends the at least one protocol layer status report (e.g., protocol layer status report 1714) to the network.

The apparatus may include additional modules that perform each of the blocks of the algorithm in the aforementioned flow chart of FIG. 16. As such, each block in the aforementioned flow chart of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
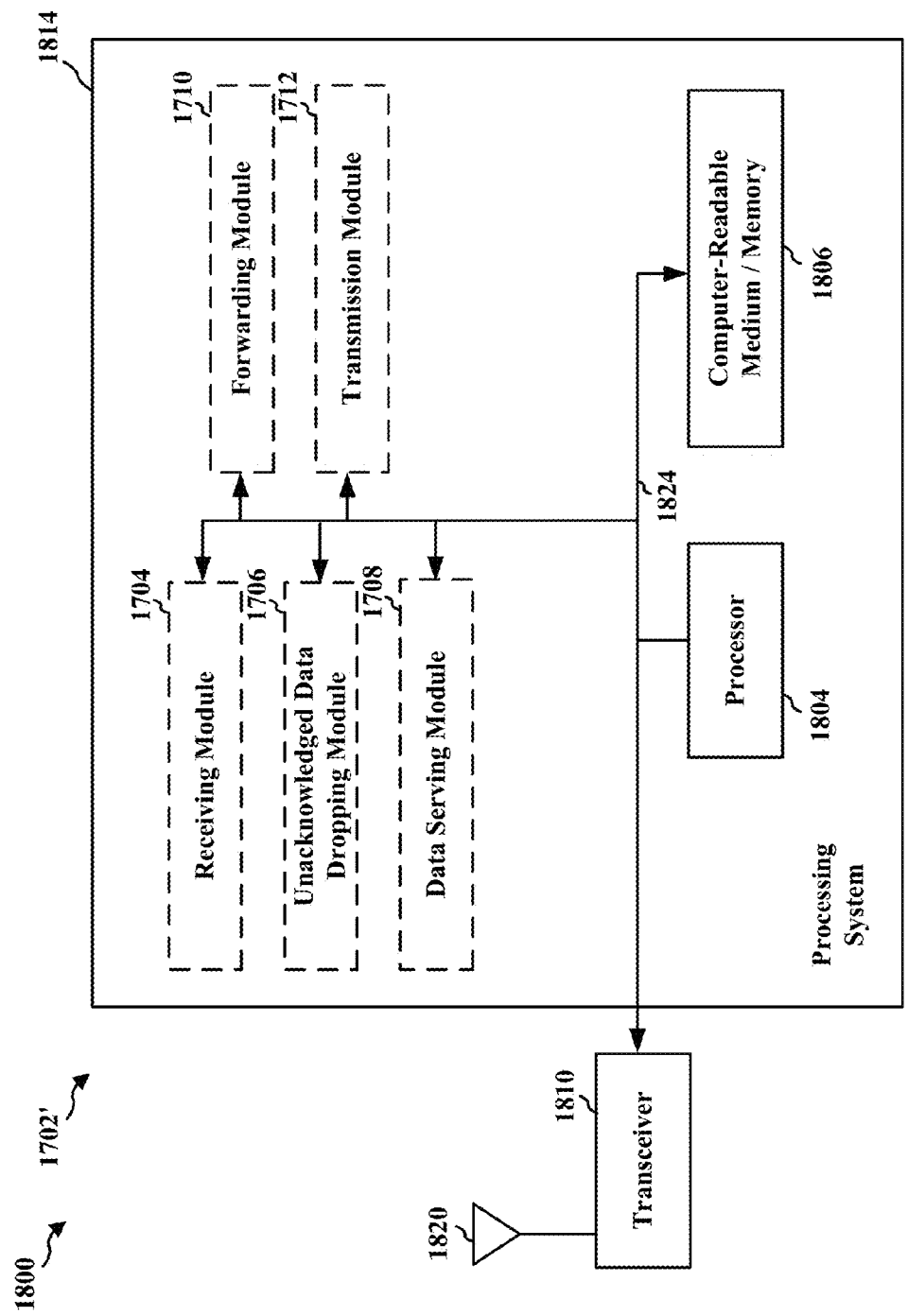
FIG. 18 is a diagram illustrating an example of a hardware implementation for an apparatus employing a processing system, in accordance with various aspects of the present disclosure.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, and 1712, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception module 1704. In addition, the transceiver 1810 receives information from the processing system 1814, specifically the transmission module 1712, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, 1708, 1710, and 1712. The modules may be software modules running in the processor 1804, resident/stored in the computer readable medium/memory 1806, one or more hardware modules coupled to the processor 1804, or some combination thereof. The processing system 1814 may be a component of the eNB 610 and may include the memory 676 and/or at least one of the TX processor 616, the RX processor 670, and the controller/processor 675.

In one configuration, the apparatus 1702/1702' for wireless communication includes means for serving data forwarded by a network to a UE via a first communication link that uses a first RAT, means for receiving a message from the network indicating that the data will be served to the UE via a second communication link that uses a second RAT, means for no longer serving the data to the UE via the first communication link that uses the first RAT upon receiving the message, means for dropping unacknowledged data stored in a buffer upon receiving the message, means for no longer serving the data forwarded by the network to the UE when an amount of failed data due to transmission errors on the first RAT exceeds a threshold, means for receiving at least one protocol layer status report from the UE via the first communication link that uses the first RAT, means for sending the at least one protocol layer status report to the network. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a base station, comprising:
    serving data to a user equipment (UE) or receiving data from the UE via a first communication link that uses a first radio access technology (RAT);
    transmitting a configuration message to the UE indicating that data will be served or received via a second communication link that uses a second RAT;
    transmitting at least one first protocol layer status report to the UE, the first protocol status report being associated with one or more downlink packets sent by the base station;
    determining unacknowledged data of the data served to the UE using the first RAT based on at least one second protocol layer status report received from the UE; and
    initiating a configuration procedure to switch service or reception of only the unacknowledged data from the first communication link that uses the first RAT to the second communication link that uses the second RAT, wherein the at least one first protocol layer status report is transmitted on a data bearer that is being switched to the second RAT.

2. The method of claim 1, further comprising forwarding the unacknowledged data to be served using the second RAT.

3. The method of claim 1, wherein the configuration message may comprise a data status report and a request for a data status report from the UE.

4. The method of claim 1, further comprising determining to serve the data using the second RAT based on at least one condition.

5. The method of claim 4, wherein the at least one condition comprises reception of a physical layer acknowledgment for the configuration message from the UE, or reception of a radio resource control (RRC) message in response to the configuration message.

6. The method of claim 4, further comprising resetting a radio link control (RLC) layer upon determining to serve the data using the second RAT.

7. The method of claim 1, further comprising receiving the at least one second protocol layer status report from the UE, the at least one second protocol layer status report identifying data received by the UE among the data served to the UE via the first RAT.

8. The method of claim 7, wherein the at least one second protocol layer status report is received via the first RAT.

9. The method of claim 7, wherein the at least one second protocol layer status report comprises at least one of a packet data convergence protocol (PDCP) layer status report or a radio link control (RLC) layer status report.

10. The method of claim 1, further comprising receiving an acknowledgment message from the UE for the configuration message via the first communication link that uses the first RAT, wherein at least one second protocol layer status report is received from the UE concurrently with the acknowledgment message or within the acknowledgment message.

11. The method of claim 1, further comprising receiving an acknowledgment from the UE for the configuration message, wherein unacknowledged data is forwarded to the second RAT in response to the received acknowledgment.

12. The method of claim 1, further comprising detecting a physical layer acknowledgment for the configuration message, wherein the unacknowledged data is forwarded in response to the detected physical layer acknowledgment.

13. The method of claim 1, wherein the at least one first protocol layer status report is sent to the UE concurrently with the configuration message or within the configuration message or another signaling message.

14. The method of claim 1, wherein the at least one first protocol layer status report is sent via the first RAT or the second RAT.

15. The method of claim 14, wherein the at least one first protocol layer status report is sent to the UE via the first RAT either concurrently with the configuration message, after reception of a physical layer acknowledgment from the UE for the configuration message, or after receiving an acknowledgment message from the UE for the configuration message.

16. The method of claim 1, wherein the at least one first protocol layer status report comprises at least one of a packet data convergence protocol (PDCP) layer status report or a radio link control (RLC) layer status report.

17. The method of claim 1, further comprising receiving feedback information from an access point (AP), wherein the feedback information indicates a status for successfully transmitted and failed data packets.

18. The method of claim 1, further comprising storing a copy of the data to be served via the second communication link that uses the second RAT in a buffer.

19. The method of claim 1, further comprising:
receiving feedback information from an access point (AP) or the UE for a status of transmission success of packets;
determining, based on the feedback information, whether an amount of forwarded data that is waiting in a buffer of the UE or the AP exceeds a threshold; and
no longer forwarding data to the AP when an amount of the data in an access point (AP) buffer exceeds the threshold.

20. The method of claim 1, further comprising no longer forwarding data to an access point (AP) or the UE when an amount of failed packets due to transmission errors on the second RAT exceeds a threshold.

21. The method of claim 20, wherein the at least one second protocol layer status report is received through an access point (AP) or the UE when the at least one second protocol layer status report is received via the second RAT.

22. The method of claim 1, further comprising transmitting the at least one first protocol layer status report and receiving the at least one second protocol layer status report to and from the UE via the first communication link that uses the first RAT or the second communication link that uses the second RAT.

23. The method of claim 1, further comprising no longer forwarding data to an access point (AP) or the UE when an amount of failed packets due to transmission errors on the second communication link that uses the second RAT exceeds a threshold.

24. A method of wireless communication of a user equipment (UE), comprising:
receiving first data served from a network or transmitting second data to the network via a first communication link that uses a first radio access technology (RAT);
receiving a configuration message from the network indicating that the first data will be served from the network or the second data will be transmitted to the network via a second communication link that uses a second RAT;
receiving at least one first protocol layer status report from the network, the at least one first protocol status report being associated with the first data served to the network or the second data transmitted to the network;
transmitting at least one second protocol layer status report to the network, the at least one second protocol status report being associated with the first data served to the network or the second data transmitted to the network;
configuring at least one protocol layer based on the received configuration message to receive the first data served from the network or transmit the second data to the network via the second communication link that uses the second RAT;
receiving the first data served from the network or transmitting the second data to the network via the second communication link that uses the second RAT; and
transmitting only unacknowledged data of the second data originally transmitted to the network via the first communication link that uses the first RAT to the network via the second communication link that uses the second RAT, wherein the at least one first protocol layer status report is received on a data bearer that is being switched to the second RAT.

25. An apparatus for wireless communication, comprising:
a memory; and
at least one processor coupled to the memory and configured to:
serve data to a user equipment (UE) or receive data from the UE via a first communication link that uses a first radio access technology (RAT);
transmit at least one first protocol layer status report to the UE, the first protocol status report being associated with one or more downlink packets sent by a base station;
transmit a configuration message to the UE indicating that data will be served or received via a second communication link that uses a second RAT;
determine unacknowledged data of the data served to the UE using the first RAT based on at least one second protocol layer status report received from the UE; and
initiate a configuration procedure to switch service or reception of only the unacknowledged data from the first communication link that uses the first RAT to the second communication link that uses the second RAT, wherein the at least one first protocol layer status report is transmitted on a data bearer that is being switched to the second RAT.

* * * * *

UNITED STATES PATENT AND TRADEMARK OFFICE
CERTIFICATE OF CORRECTION

PATENT NO. : 9,854,478 B2  
APPLICATION NO. : 14/598170  
DATED : December 26, 2017  
INVENTOR(S) : Ozcan Ozturk et al.

It is certified that error appears in the above-identified patent and that said Letters Patent is hereby corrected as shown below:

In the Claims

Column 36, Line 25 and Line 30, Claim 24, replace "to" with --from--.

Signed and Sealed this
Nineteenth Day of June, 2018

Andrei Iancu
*Director of the United States Patent and Trademark Office*